(12) United States Patent
Nomura et al.

(10) Patent No.: US 7,944,103 B2
(45) Date of Patent: May 17, 2011

(54) MOTOR

(75) Inventors: Masashi Nomura, Kyoto (JP);
Masamichi Nagata, Kyoto (JP)

(73) Assignee: Nidec Corporation, Kyoto (JP)

( * ) Notice: Subject to any disclaimer, the term of this patent is extended or adjusted under 35 U.S.C. 154(b) by 318 days.

(21) Appl. No.: 12/123,829

(22) Filed: May 20, 2008

(65) Prior Publication Data

US 2008/0290747 A1    Nov. 27, 2008

(30) Foreign Application Priority Data

May 21, 2007  (JP) ................. 2007-134166

(51) Int. Cl.
*H02K 7/00* (2006.01)
(52) U.S. Cl. ................ 310/90; 310/67 R; 310/91
(58) Field of Classification Search .......... 310/67 R, 310/401, 425, 89–91
See application file for complete search history.

(56) References Cited

U.S. PATENT DOCUMENTS

| | | | |
|---|---|---|---|
| 4,213,471 A | 7/1980 | Burian et al. | |
| 4,337,405 A | 6/1982 | Hishida | |
| 4,480,206 A | 10/1984 | Manson | |
| 4,604,665 A | 8/1986 | Muller et al. | |
| 4,682,065 A | 7/1987 | English et al. | |
| 4,858,044 A | 8/1989 | Crapo | |
| 5,497,040 A | 3/1996 | Sato | |
| 5,677,585 A * | 10/1997 | Ida et al. | 310/91 |
| 5,883,455 A * | 3/1999 | Fukasawa et al. | 310/91 |
| 5,910,694 A | 6/1999 | Yokozawa et al. | |
| 6,204,583 B1 | 3/2001 | Sasaki et al. | |
| 6,242,830 B1 | 6/2001 | Katagiri | |
| 6,256,289 B1 | 7/2001 | Miyamoto | |
| 6,729,764 B2 | 5/2004 | Kobayashi et al. | |
| 7,023,116 B2 | 4/2006 | Kuribara | |
| 7,242,121 B2 | 7/2007 | Kadowaki | |
| 7,420,310 B2 | 9/2008 | Kadowaki et al. | |
| 7,550,384 B2 | 6/2009 | Ban et al. | |
| 7,732,957 B2 | 6/2010 | Nomura et al. | |
| 2002/0063494 A1 | 5/2002 | Yoshikawa et al. | |
| 2004/0239198 A1 | 12/2004 | Horng et al. | |
| 2005/0077792 A1 | 4/2005 | Winkler | |
| 2005/0116557 A1 | 6/2005 | Rojo Lulic | |
| 2005/0134136 A1 | 6/2005 | Horng et al. | |
| 2006/0279150 A1 | 12/2006 | Kojima et al. | |
| 2008/0247689 A1 | 10/2008 | Nomura et al. | |

FOREIGN PATENT DOCUMENTS

| | | |
|---|---|---|
| JP | 6-22527 A | 1/1994 |
| JP | 6-86523 A | 3/1994 |
| JP | 7-75312 A | 3/1995 |
| JP | 7-274434 A | 10/1995 |
| JP | 8-275439 A | 10/1996 |
| JP | 10-127006 A | 5/1998 |
| JP | 2000-23436 A | 1/2000 |
| JP | 2000-60057 A | 2/2000 |
| JP | 2001-25202 A | 1/2001 |
| JP | 2001-128421 A | 5/2001 |
| JP | 2003-32987 A | 1/2003 |
| JP | 3098557 U | 3/2004 |
| JP | 2006-067652 A | 3/2006 |
| JP | 2006-158013 A | 6/2006 |
| JP | 2007-110791 A | 4/2007 |
| JP | 2009-100539 A | 5/2009 |

\* cited by examiner

*Primary Examiner* — Dang D Le
(74) *Attorney, Agent, or Firm* — Keating & Bennett, LLP

(57) ABSTRACT

A fixation portion of an attachment plate is fixed onto an upper surface of a flange portion of a housing. In a cylindrical retentive portion of the housing, there is formed an expanded diameter portion which is continuous to the flange portion. There is disposed a ball bearing in the expanded diameter portion. Formed integrally with the flange portion is a fitting portion such that the fitting portion is continuous to the expanded diameter portion.

20 Claims, 19 Drawing Sheets

MOTOR

BACKGROUND OF THE INVENTION

1. Field of the Invention

The present invention relates to a structure of a motor including a housing formed by pressing.

2. Description of the Related Art

In recent years, due to reductions in size and price of a copier, a motor installed therein is also required to be further reduced in size and price.

A structure of a conventional motor will be described with reference to FIG. 19. FIG. 19 is a schematic cross sectional view of the conventional motor cut along an axial direction thereof.

Referring to FIG. 19, a motor 1 includes a shaft 2 disposed coaxially with a central axis J1, two bearing portions 3 axially spaced apart from each other to rotatably support the shaft 2, a housing 4 having a cylindrical portion 4a retaining the respective bearing portions 3 and a flange portion 4b extending radially outwards from the cylindrical portion 4a, a stator 5 fixed onto an outer peripheral surface of the cylindrical portion 4a of the housing 4, a rotor holder 6 having a cup shape and fixed to the shaft 2, a rotor magnet 7 fixed onto an inner peripheral surface of the rotor holder 6 to radially face the stator 5, and an attachment plate 8 attached to the housing 4. The housing 4 is shaped by die casting zinc alloy. The attachment plate 8 is caulked to be fixed onto a lower surface of the flange portion 4b of the housing 4. The attachment plate 8 is formed with a mounting portion 8a used for mounting the motor 1 to another device (not shown).

However, the housing 4 shaped by die casting zinc alloy requires expensive material and shaping costs, so that reduction in price of the motor cannot be realized as required. In addition, reduction in size of the motor is required particularly in an axial height from a lower surface of the mounting portion 8a to an upper surface of the rotor holder 6. Nonetheless, the attachment plate 8 is attached onto the lower surface of the flange portion 4b in the conventional motor 1, so that the position of the mounting portion 8a has been required to be axially lowered by a distance corresponding to a thickness of the attachment plate 8, resulting in difficulty in size reduction in the motor 1. Further, since the housing 4 and the attachment plate 8 are fixed to each other by caulking, a region 4c to be caulked projects axially downwards from the attachment plate 8. Therefore, the position of the mounting portion 8a has been required further to be axially lowered, resulting in further difficulty in size reduction in the motor 1.

SUMMARY OF THE INVENTION

The present invention provides a motor including a shaft functioning as a central axis; a housing having a cylindrical portion and a flange portion, where the cylindrical portion is provided with an inner peripheral surface and an outer peripheral surface each having an axial center identical to the central axis and extending along the axial direction, and the flange portion is formed integrally with the cylindrical portion and is provided with an upper surface and a lower surface each extending radially outwards; an attachment plate having a fixation portion and a plurality of mounting portions, where the fixation portion has a flat plate shape and is provided with a lower surface fixed only to the upper surface of the flange portion, and the mounting portions are formed integrally with the fixation portion and are used to fix another member thereonto; and a bearing portion retained onto the inner peripheral surface of the cylindrical portion to rotatably support the shaft.

The present invention also provides a motor including a shaft functioning as a central axis; a housing having a cylindrical portion and a flange portion, where the cylindrical portion is provided with an inner peripheral surface and an outer peripheral surface each having an axial center identical to the central axis and extending along the axial direction, and the flange portion is formed integrally with the cylindrical portion and is provided with an upper surface and a lower surface each extending radially outwards; and an armature disposed radially outside the cylindrical portion and having an armature core which is provided with an inner peripheral surface radially facing the outer peripheral surface of the cylindrical portion. There is formed a recess which is concave radially outwards on the inner peripheral surface of the armature core, while the cylindrical portion is formed integrally with a projection which is to be engaged with the recess.

The present invention further provides a motor including a shaft functioning as a central axis; a housing having a cylindrical portion and a flange portion, where the cylindrical portion is provided with an inner peripheral surface and an outer peripheral surface each having an axial center identical to the central axis and extending along the axial direction, and the flange portion is formed integrally with the cylindrical portion and is provided with an upper surface and a lower surface each extending radially outwards; and a plurality of bearing portions which are disposed while being axially spaced apart from one another and are retained onto the inner peripheral surface of the cylindrical portion to rotatably support the shaft. The cylindrical portion is provided with an expanded diameter portion which increases respective radial distances from the central axis to the inner peripheral surface and the outer peripheral surface of the cylindrical portion. Disposed radially inside the expanded diameter portion is a ball bearing, which functions as one of the bearing portions, having an inner ring retained by the shaft and an outer ring retained by the expanded diameter portion. Retained onto the inner peripheral surface of the cylindrical portion is a positioning member to determine an axial position of the bearing portion. The positioning member has a cylindrical fixation portion in contact with the inner peripheral surface of the cylindrical portion and a placing portion extending radially outwards from the cylindrical fixation portion and accommodated in the expanded diameter portion. The placing portion is provided with a lower surface axially facing at least the outer ring of the ball bearing, and there is provided an elastic member axially between the placing portion and the outer ring of the ball bearing such that the elastic member is compressed to be interposed therebetween.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
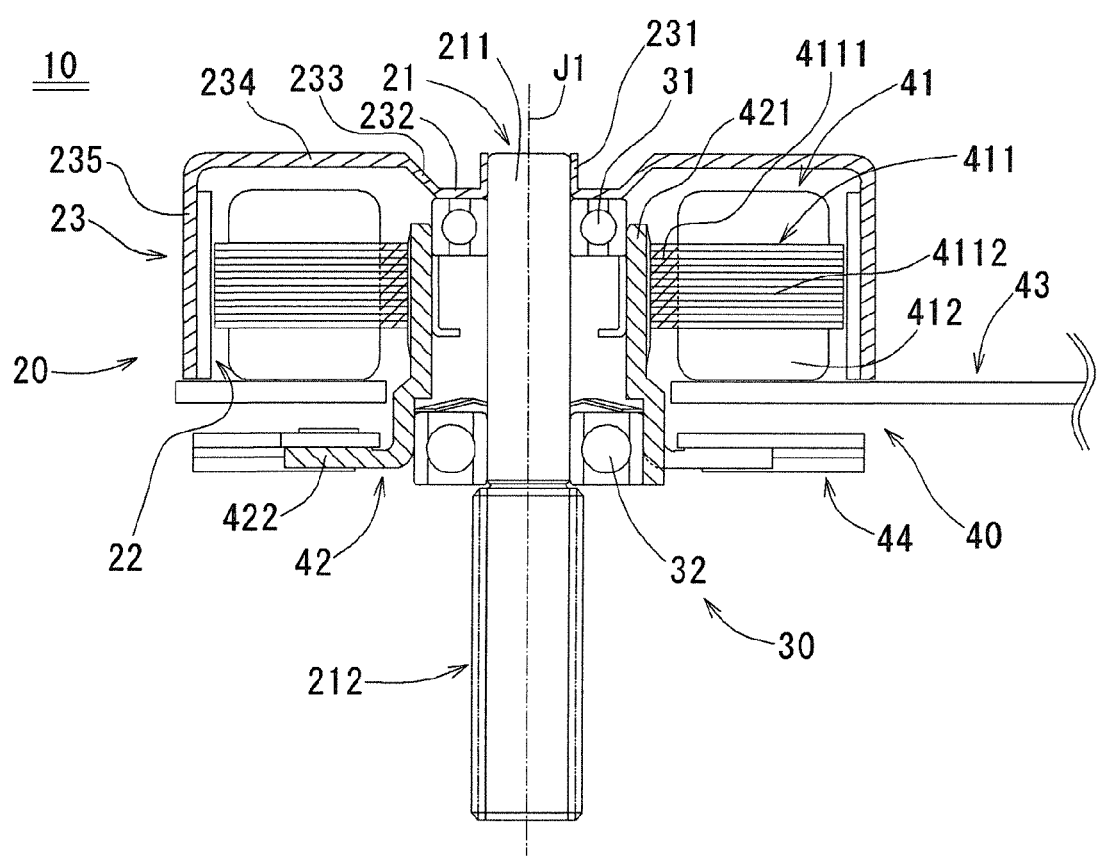
FIG. 1 is a schematic cross sectional view of a motor cut along an axial direction, according to a first preferred embodiment of the present invention.

Referring to FIGS. 1 through 19, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel to a rotation axis, and a radial direction indicates a direction perpendicular to the rotation axis.

Motor According to First Preferred Embodiment

Description is given to a motor according to a first preferred embodiment of the present invention with reference to FIG. 1. FIG. 1 is a schematic cross sectional view of the motor cut along an axial direction, according to the first preferred embodiment.

Referring to FIG. 1, a motor 10 is preferably configured with a rotor 20 having a shaft 21 disposed coaxially with a central axis J1 and a rotor magnet 22 rotating integrally with the shaft 21, two bearing portions 30 axially spaced apart from each other to rotatably support the rotor 20, and a stator 40 having an armature 41 disposed to radially face the rotor magnet 22. As a matter of convenience, in the following description, the rotor 20 is assumed to be located on an axially upper side while the stator 40 being located on an axially lower side. However, such vertical relationships are not necessarily along the direction of gravitational force.

The rotor 20 is preferably configured with the shaft 21 having a substantially column shape and extending along the axial direction, a rotor holder 23 fixed to an axially upper end of the shaft 21, and the rotor magnet 22 fixed to the rotor holder 23.

The shaft 21 is preferably configured with a bearing fixation portion 211 fixing the respective two bearing portions 30, and a gear portion 212 formed axially under the bearing fixation portion 211. According to the present preferred embodiment, the gear portion 212 is preferably provided integrally with a helical gear. An outer diameter of the gear portion 212 is preferably made larger than that of the bearing fixation portion 211.

The rotor holder 23 is preferably formed by pressing a magnetic metal plate. The rotor holder 23 is preferably configured with a shaft fixation portion 231 having a cylindrical shape and fixed to the shaft 21, an inner cap portion 232 extending radially outwards continuously from a lower end of the shaft fixation portion 231, an inclined surface 233 expanding a diameter thereof axially upwards from the inner cap portion 232, an outer cap portion 234 having a plane shape and extending radially outwards from the inclined surface 233, and a cylindrical portion 235 having a substantially cylindrical shape and extending axially downwards continuously from an outer peripheral end of the outer cap portion 234. The rotor magnet 22 is preferably fixed with adhesive onto an inner peripheral surface of the cylindrical portion 235 of the rotor holder 23.

The stator 40 preferably includes a housing 42 having a cylindrical retentive portion 421 which is provided with an inner peripheral surface and an outer peripheral surface each having an axial center identical to the central axis and a flange portion 422 provided with an upper surface and a lower surface extending radially outwards into an annular shape from a lower end of the cylindrical retentive portion 421, the armature 41 fixed onto an outer peripheral surface of the cylindrical retentive portion 421, a circuit board 43 disposed axially under the armature 41, and an attachment plate 44 disposed axially below the circuit board 43 and fixed onto the upper surface of the flange portion 422. The circuit board 43 is preferably disposed axially above the attachment plate 44, and the circuit board 43 and the attachment plate 44 are axially spaced apart from each other.

The bearing portions 30 are preferably disposed respectively at axially upper and lower ends of the cylindrical retentive portion 421 with an axial space therebetween. In the present preferred embodiment, the bearing portions 30 on the axially upper and axially lower sides correspond respectively to ball bearings 31 and 32. Further, in the present preferred embodiment, the ball bearing 32 preferably has an outer diameter larger than that of the ball bearing 31.

The armature 41 is preferably formed with a plurality of magnetic thin steel plates laminated in the axial direction. The armature 41 is preferably configured with an armature core 411 including a core back portion 4111 (a section marked with diagonal lines in the armature 41 of FIG. 1) in a substantially annular shape having an inner peripheral surface in contact with the outer peripheral surface of the cylindrical retentive portion 421 and tooth portions 4112 each extending from the core back portion 4111 to be away from the central axis J1, and coils 412 each made by winding conductive wires into a plurality of layers around each of the tooth portions 4112. There are preferably provided with the plurality (twelve in the present preferred embodiment) of tooth portions 4112 circumferentially spaced apart from one another. The armature core 411 is preferably applied with an insulation coating to obtain electrical insulation.

Figure 12:
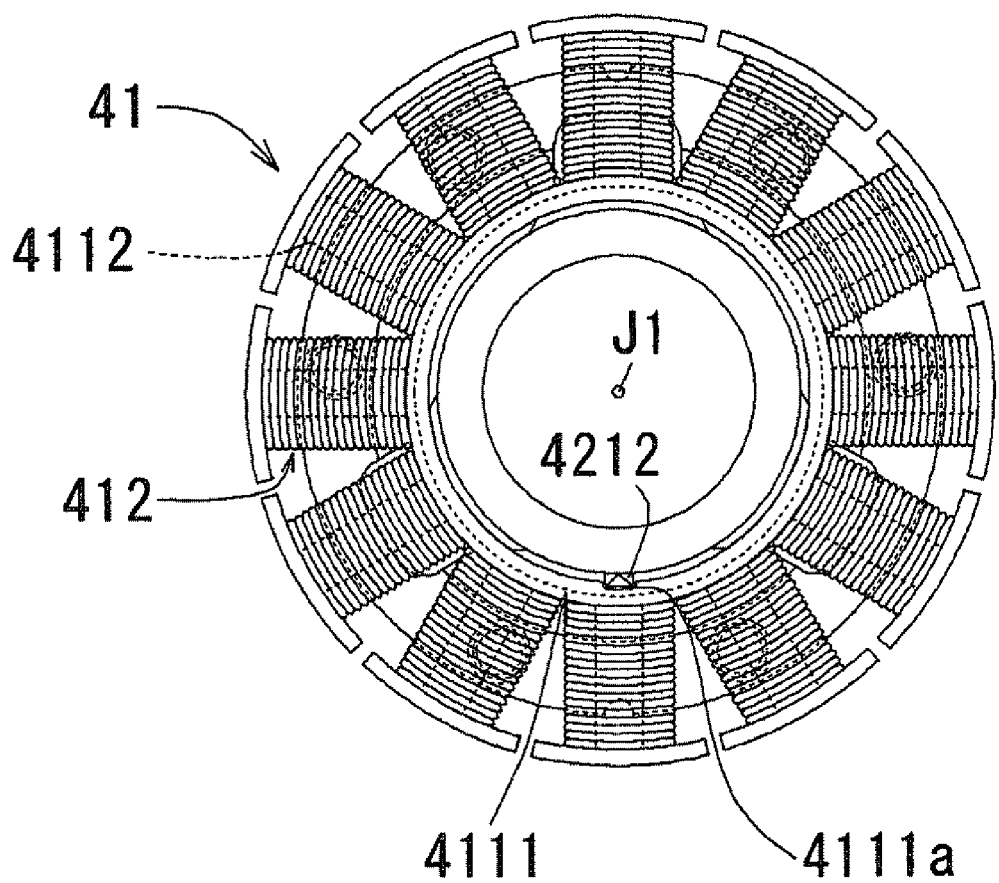
FIG. 12 is a plan view seen from above to illustrate the state where the stator is fixed to the housing according to the present invention.

There is preferably formed a radial recess 4111a which is concaved radially outwards partially in the circumferential direction on the inner peripheral surface of the core back portion 4111 (see FIG. 12). The radial recess 4111a preferably penetrates from an upper end surface to a lower end surface of the core back portion 4111 which is formed with a plurality of steel plates layered in the axial direction.

The armature 41 preferably generates a magnetic field when electric power is distributed to the coils 412 through the circuit board 43 from an external power supply (not shown). In such a case, rotary torque about the central axis J1 is generated between the armature 41 and the rotor magnet 22, so that the rotor 20 is rotated about the central axis J1.

Structure of Housing 42

Figure 2:
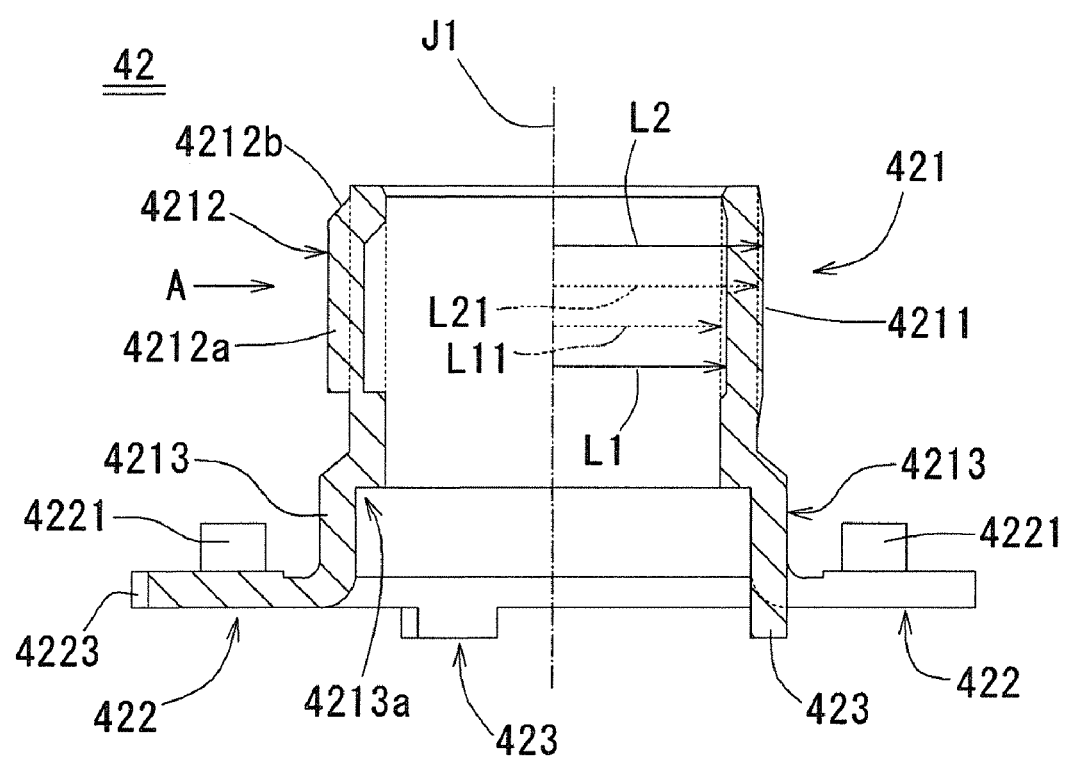
FIG. 2 is a schematic cross sectional view of a housing cut along the axial direction, according to the first preferred embodiment of the present invention.
Figure 3:
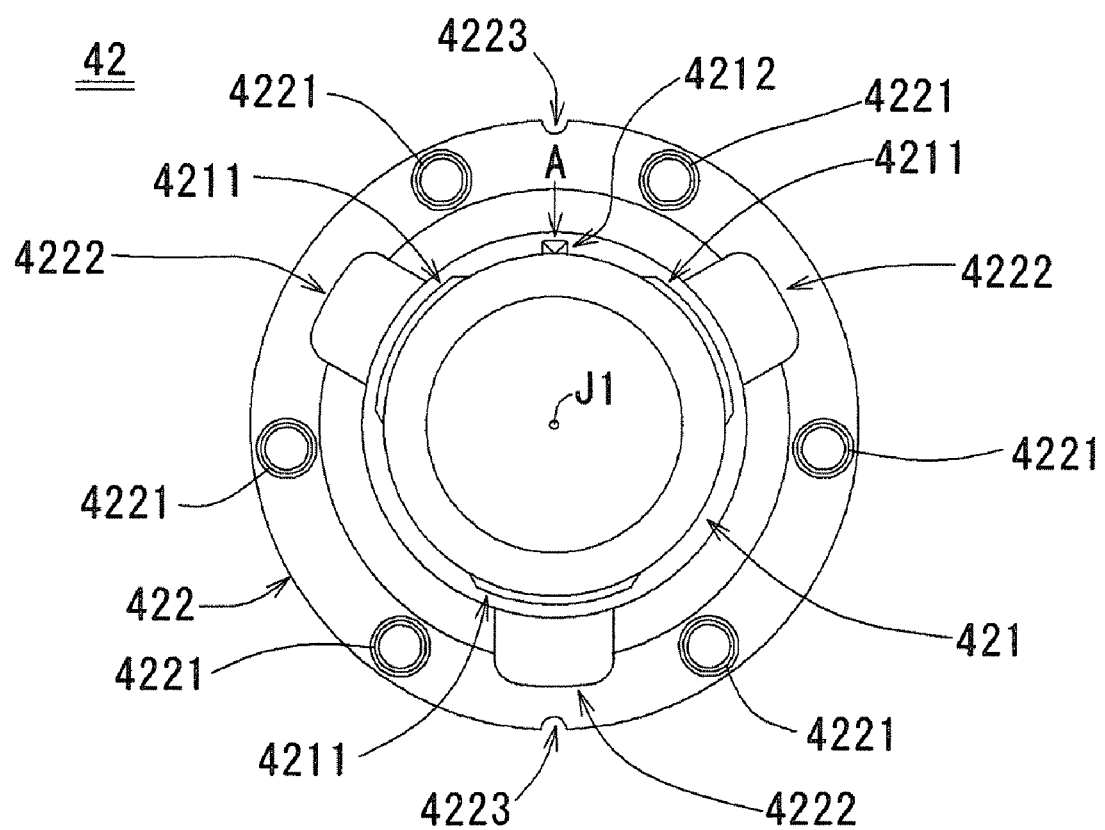
FIG. 3 is a plan view seen from above, of the housing according to the first preferred embodiment of the present invention.
Figure 4:
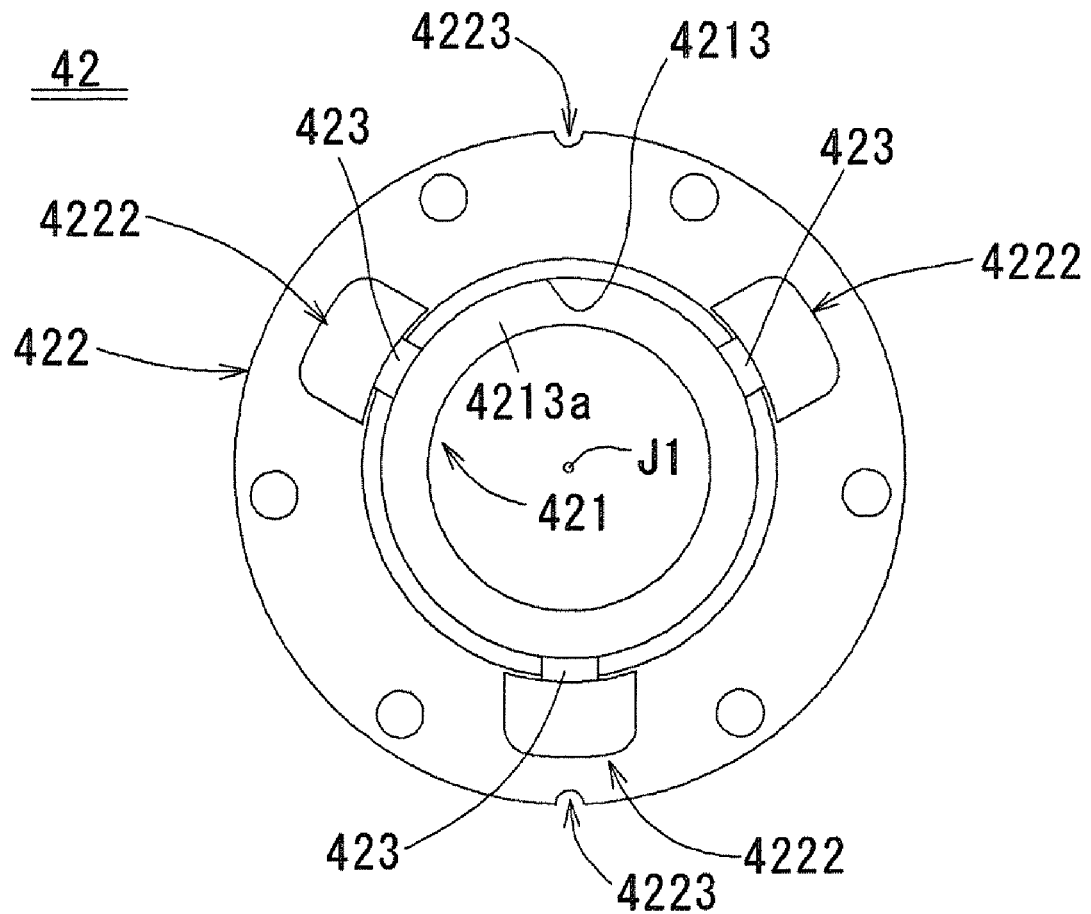
FIG. 4 is a plan view seen from below, of the housing according to the first preferred embodiment of the present invention.
Figure 5:
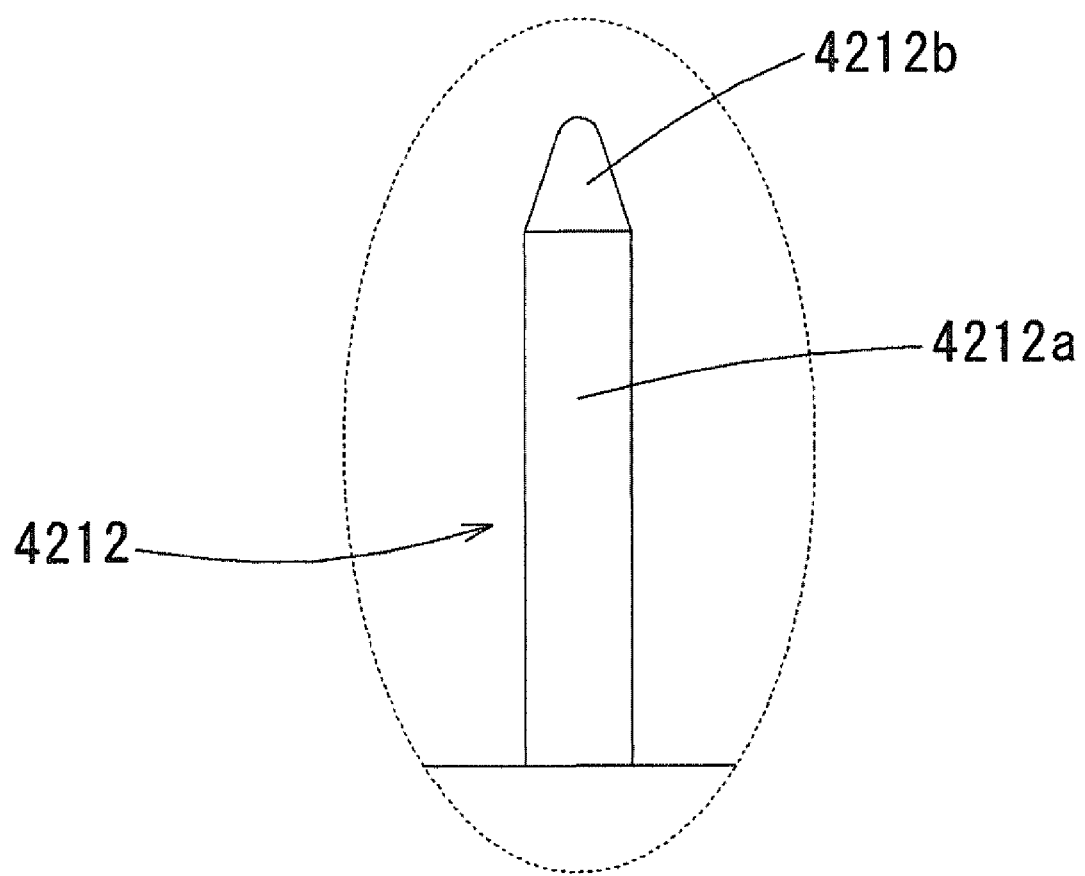
FIG. 5 is an enlarged view of a rotation inhibiting projection of the housing according to the present invention.
Figure 6:
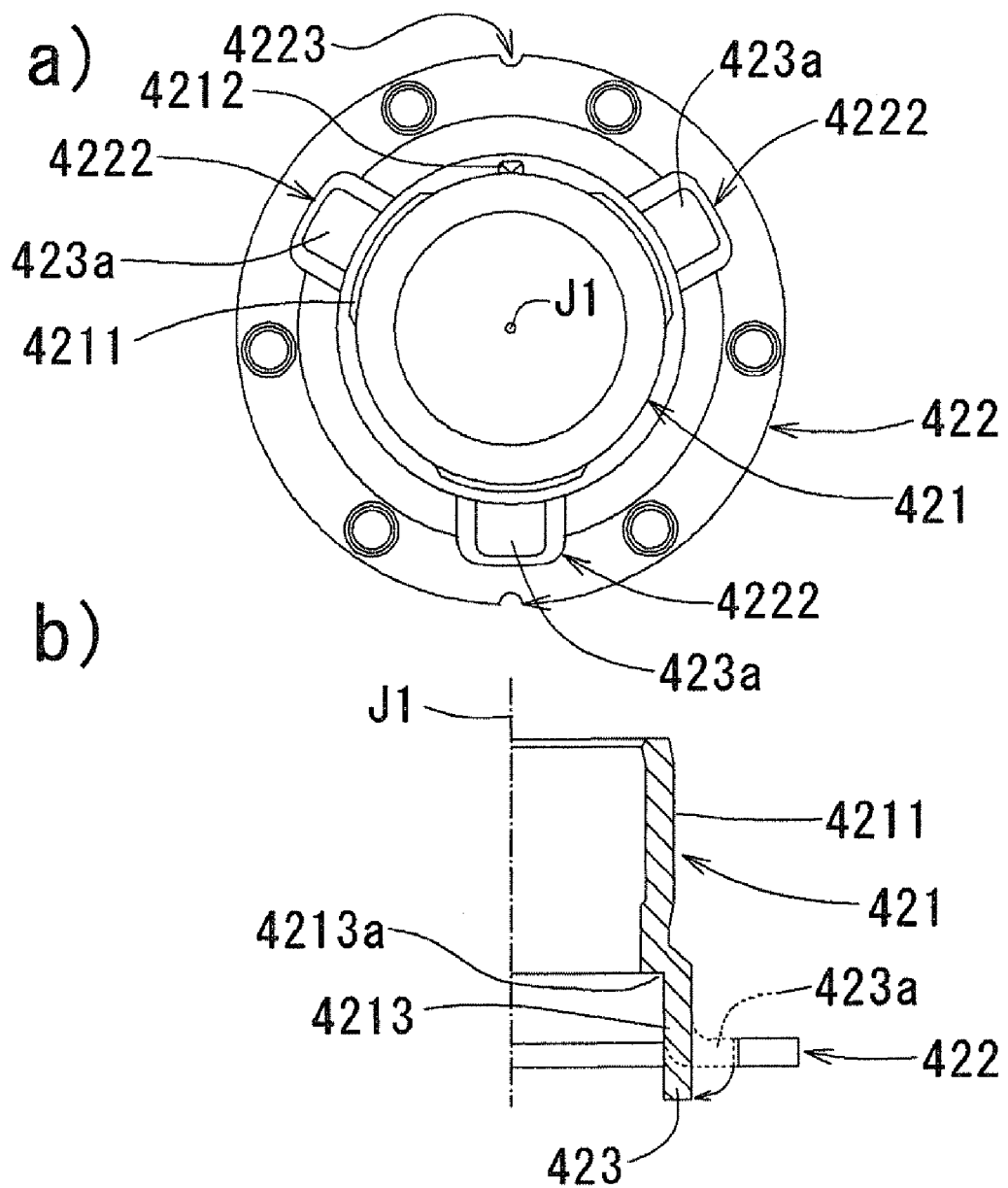
FIG. 6A is a plan view seen from above to illustrate a state before a fitting portion is formed in a process of forming the fitting portion of the housing according to the present invention.
FIG. 6B is a schematic cross sectional view cut along the axial direction to illustrate a state after the fitting portion is formed.

With reference to FIGS. 2 to 6, described below is a structure of the housing 42 according the first preferred embodiment of the present invention. FIG. 2 is a schematic cross sectional view of the housing 42 cut along the axial direction. FIG. 3 is a schematic plan view seen from above, of the housing 42. FIG. 4 is a schematic plan view seen from below, of the housing 42. FIG. 5 is a schematic enlarged view of a projection 4212 seen along an arrow A of FIGS. 2 and 3. FIGS. 6A and 6B each shows a process of forming fitting portions 423, and specifically, FIG. 6A illustrates a state before the fitting portions 423 are formed while FIG. 6B is a schematic half cross sectional view to illustrate a state after the fitting portions 423 are formed.

Referring to FIG. 2, the housing 42 is preferably configured with the cylindrical retentive portion 421 formed by drawing compound into a cylindrical shape having an axial center identical to the central axis J1, the flange portion 422 extending radially outwards into the annular shape continuously from the lower end of the cylindrical retentive portion 421, and the fitting portions 423 each extending axially downwards from the flange portion 422.

The cylindrical retentive portion 421 is preferably formed with a plurality (three in the present preferred embodiment; see FIG. 3) of armature retentive portions 4211 (which corresponds to expanded diameter portions in the claims) while being circumferentially spaced apart from one another and being in contact with the inner peripheral surface of the core back portion 4111 of the armature 41. A radial distance L1 from the central axis J1 to an inner peripheral surface and a radial distance L2 from the central axis J1 to an outer peripheral surface of the armature retentive portion 4211 are made respectively larger than a radial distance L11 from the central axis J1 to the inner peripheral surface and a radial distance L21 from the central axis J1 to the outer peripheral surface of the cylindrical retentive portion 421.

Further, there is preferably formed the projection 4212 (one in the present preferred embodiment; see FIG. 3) at a position on the cylindrical retentive portion 421 circumferentially different from positions of the armature retentive portions 4211, such that the projection 4212 is engaged with the radial recess 4111a of the core back portion 4111 in the armature 41 to restrict circumferential displacement of the armature 41 with respect to the housing 42.

The projection 4212 is preferably configured with an engaging portion 4212a having a circumferential width substantially equal to or slightly smaller by several to several hundred μm than a circumferential width of the radial recess 4111a, and a reduced portion 4212b formed continuously from an upper end of the engaging portion 4212a such that a circumferential width of the reduced portion 4212b is gradually reduced in the axially upward direction (see FIG. 5). The reduced portion 4212b is preferably inclined toward the central axis J1 in the axially upward direction. That is, a radial distance from the central axis J1 to the reduced portion 4212b is gradually reduced in the axially upward direction.

At a lower part of the cylindrical retentive portion 421, there is preferably formed an expanded diameter portion 4213 having an inner peripheral surface of which radius is larger than the radial distance L11 from the central axis J1 to the inner peripheral surface of the cylindrical retentive portion 421 and an outer peripheral surface of which radius is larger than the radial distance L21 from the central axis J1 to the outer peripheral surface of the cylindrical retentive portion 421. Formed at an upper end of the expanded diameter portion 4213 is a shoulder 4213a having a plane extending perpendicularly to the central axis J1. The shoulder 4213a preferably connects the expanded diameter portion 4213 and a region of the cylindrical retentive portion 421 axially above the expanded diameter portion 4213.

The flange portion 422 preferably has an annular plane shape extending perpendicularly to the central axis J1, and is formed by bending radially outwards the lower end of the cylindrical retentive portion 421. On the upper surface of the flange portion 422, there are preferably formed a plurality (six in the present preferred embodiment; see FIG. 3) of burling portions 4221 projecting axially upwards. The burling portions 4221 are preferably formed by burling work while being circumferentially spaced apart from one another. The burling portions 4221 are disposed substantially evenly in the circumferential direction (in the present preferred embodiment, three pairs of the burling portions 4221 are disposed evenly spaced apart from one another by 120 degrees). According to such a configuration, a fastening force between each of the burling portions 4221 and a mounting portion 443 may be preferably secured even when a load perpendicular to the axial direction is applied to the shaft 21. Particularly, since the burling portions 4221 are disposed substantially evenly in the circumferential direction and a space between the circumferentially adjacent burling portions 4221 is small, the fastening force between each of the burling portions 4221 and the mounting portion 443 may be secured regardless of a circumferential direction of the load applied to the shaft 21.

The flange portion 422 is preferably formed with a plurality (three in the present preferred embodiment; see FIG. 3) of openings 4222 while being circumferentially spaced apart from one another. At positions circumferentially corresponding to the respective openings 4222, the fitting portions 423 are preferably formed continuously from the cylindrical retentive portion 421 (expanded diameter portion 4213) (see FIGS. 2 and 4). The openings 4222, preferably, are respectively formed so as to radially extend from an inner peripheral edge of the flange portion 422 which is continuous from the cylindrical retentive portion 421. The openings 4222 respectively penetrate from the upper surface to the lower surface of the flange portion 422.

Referring to FIG. 6A, in formation of each of the fitting portions 423, there is previously formed a region 423a, which is to be formed preferably into the fitting portion 423, in each of the openings 4222. The maximum radial width and the maximum circumferential width of each of the opening 4222 are preferably made respectively larger than a radial width and a circumferential width of the region 423a to be formed into the fitting portion 423. Referring to FIG. 6B, each of the regions 423a to be formed into the fitting portions 423 is preferably bent downwards so as to be in parallel with the axial direction, so that the fitting portions 423 are respectively formed.

Further, there are preferably formed two housing-side positioning portions 4223 while being circumferentially spaced apart from each other by 180 degrees on the outer peripheral surface of the flange portion 422 (see FIG. 3). Each of the housing-side positioning portions 4223 is preferably formed as a recess in a substantially semicircular shape which is concave from the outer peripheral surface of the flange portion 422 toward the central axis J1. The circumferential position of one of the housing-side positioning portions 4223 is preferably identical to that of the projection 4212.

Structure of Attaching Housing 42 to Attachment Plate 44

Figure 7:
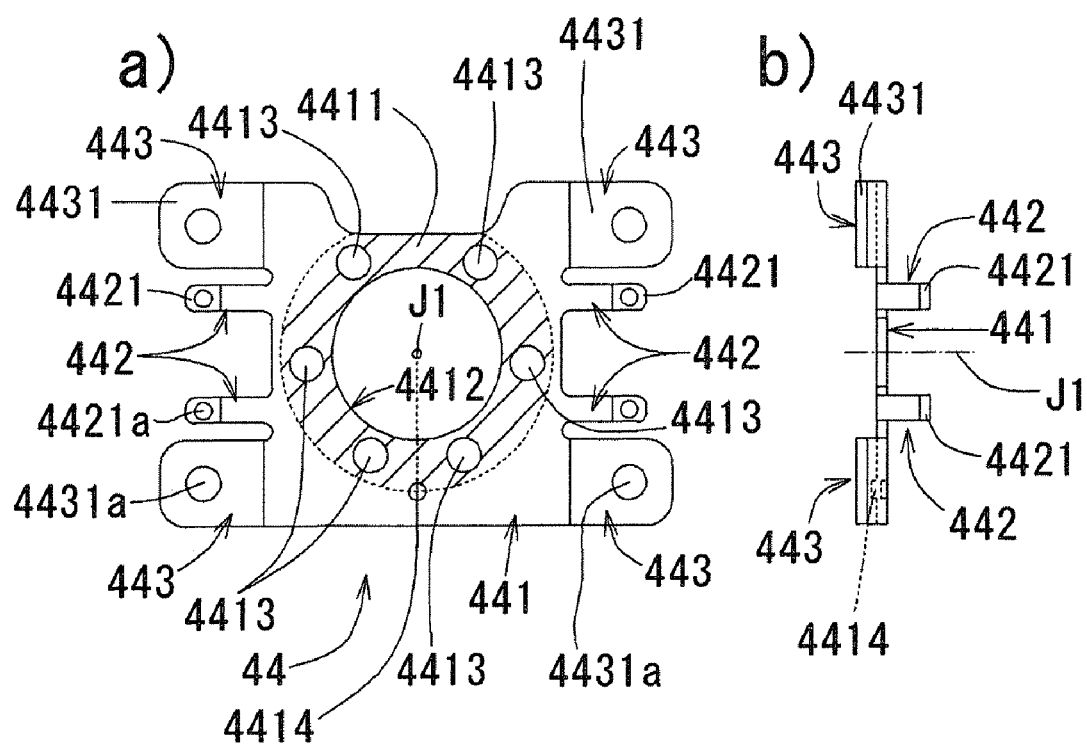
FIG. 7A is a plan view seen from below, of an attachment plate according to the present invention.
FIG. 7B is a plan view seen from a side, of the attachment plate according to the present invention.
Figure 8:
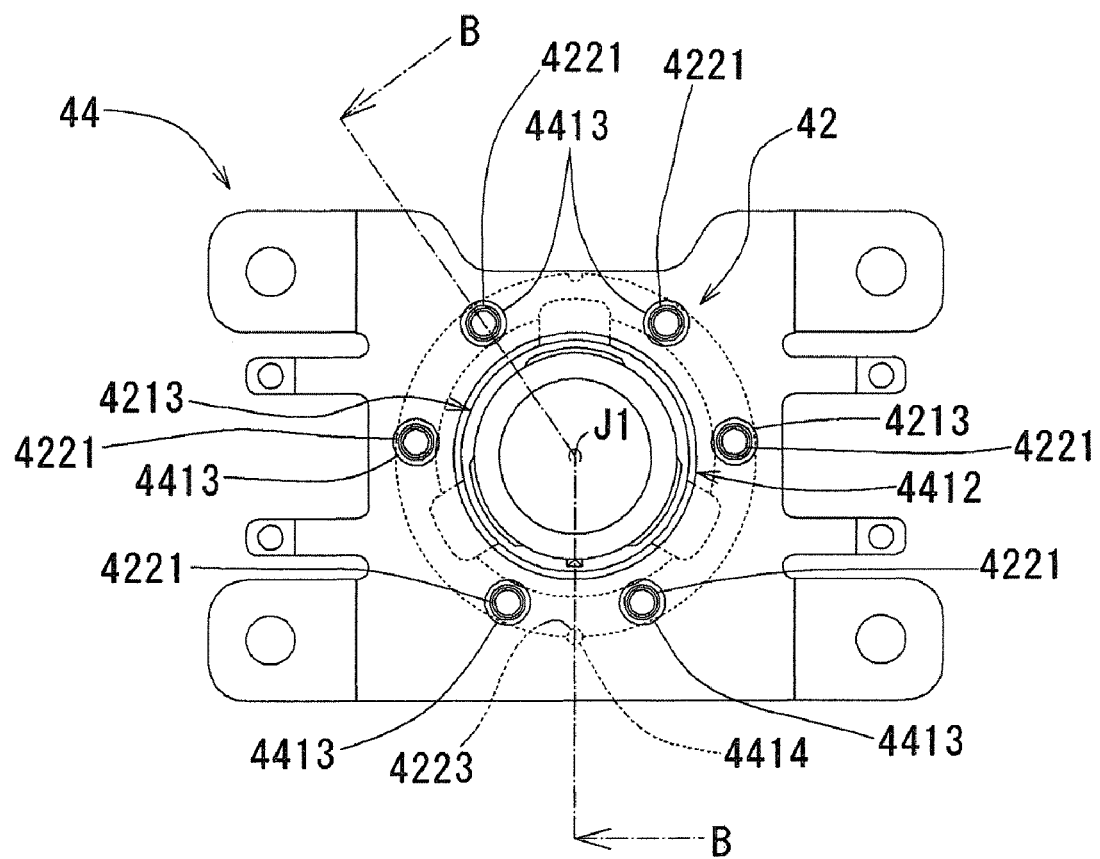
FIG. 8 is a plan view seen from above to illustrate a state where the housing is attached to the attachment plate according to the present invention.
Figure 9:
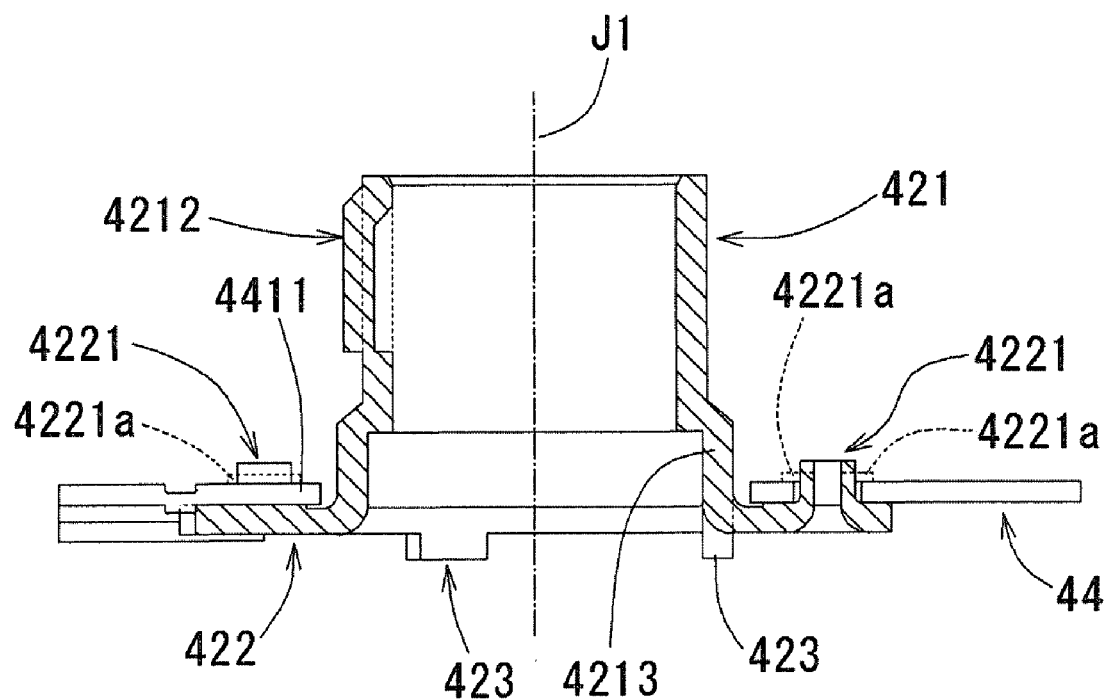
FIG. 9 is a schematic cross sectional view cut along a plane IX-IX of FIG. 8.
Figure 10:
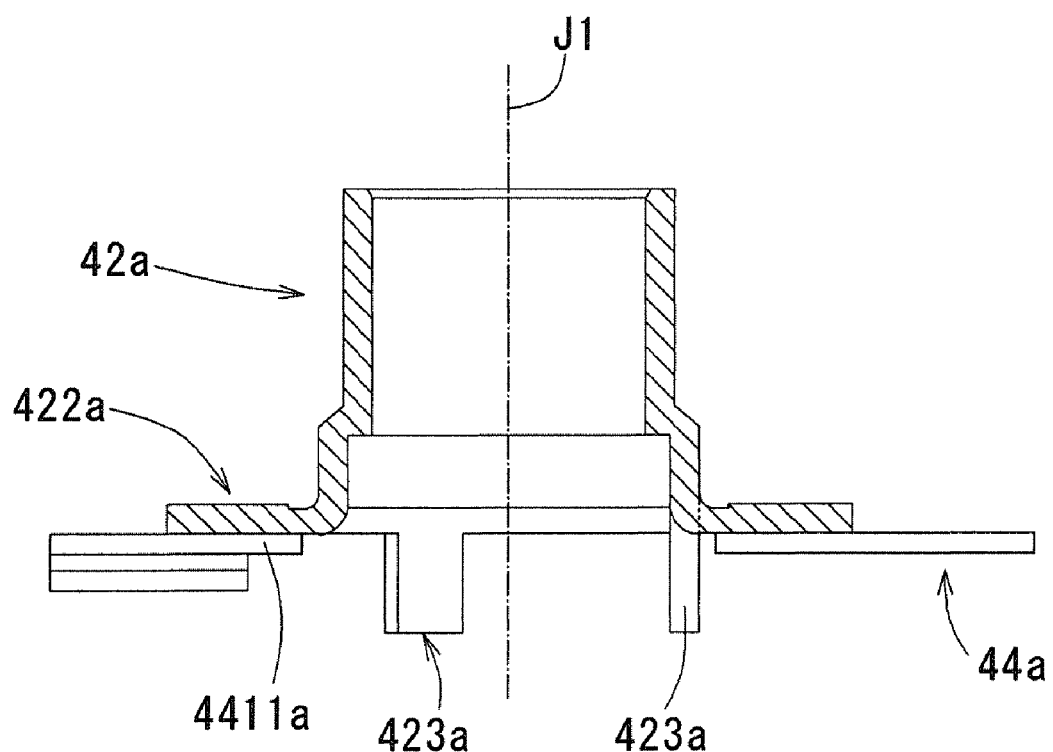
FIG. 10 is a schematic cross sectional view cut along the axial direction to illustrate another state of attaching a housing to an attachment plate according to another preferred embodiment.

With reference to FIGS. 7 to 10, description is given to a structure of attaching the housing 42 to the attachment plate 44. FIGS. 7A and 7B each show the attachment plate 44. Specifically, FIG. 7A is a plan view seen from below, and FIG. 7B is a schematic view seen from a side. FIG. 8 is a plan view seen from above to illustrate a state where the attachment plate 44 is placed onto the housing 42. FIG. 9 is a schematic cross sectional view cut along a plane IX-IX in the axial direction of FIG. 8 to illustrate a state where the attachment plate 44 is fixed onto the housing 42. FIG. 10 is a view in comparison to FIG. 9, to illustrate another state where an attachment plate 44a is fixed onto a housing 42a according to another preferred embodiment.

Referring to FIG. 7, the attachment plate 44 is preferably configured with a basal portion 441 having a fixation portion 4411 in contact with the upper surface of the flange portion 422 of the housing 42, a circuit board fixation portion 442 fixed with the circuit board 43, and the mounting portion 443 used to mount the motor 10 onto another device (not shown).

The basal portion 441 is preferably formed into a plane shape extending substantially perpendicular to the central axis J1. There is preferably formed a first through hole 4412 coaxially with the central axis J1. A radial distance from the central axis J1 to an inner peripheral surface of the first through hole 4412 is made substantially equal to or larger than the radial distance from the central axis J1 to the outer peripheral surface of the expanded diameter portion 4213 of the housing 42. In the basal portion 441, there are preferably formed second through holes 4413 each having a circular shape, at positions corresponding to the positions of the burling portions 4221 of the 42. An inner diameter of an inner peripheral surface of each of the second through holes 4413 is preferably made substantially equal to or larger than the outer diameter of the expanded diameter portions 4213. Formed around the peripheral edge of the first through hole 4412 of the basal portion 441 preferably is the fixation portion 4411 having a lower surface in contact with the upper surface of the flange portion 422 (a section marked with diagonal lines in FIG. 7A). The fixation portion 4411 is preferably formed to have a plane of flatness higher than the other regions of the basal portion 441. The upper surface of the fixation portion 4411 preferably axially faces the circuit board 43 or the armature 41 with a space therebetween. The fixation portion 4411 is preferably formed to have an outer diameter slightly larger than that of the flange portion 422 (in the present preferred embodiment, the outer diameter of the fixation portion 4411 is made larger by approximately 1 mm than the outer diameter of the flange portion 422). There is preferably formed an attachment-plate-side positioning portion 4414 (one in the present preferred embodiment) by half blanking the basal portion 441 at a position corresponding to one of the housing-side positioning portions 4223 of the housing 42. The attachment-plate-side positioning portion 4414 is preferably formed into a cylindrical shape of a radius substantially identical to an inner diameter of a substantial semicircle of the housing-side positioning portion 4223s. The attachment-plate-side positioning portion 4414 preferably projects axially downwards from the basal portion 441.

The circuit board fixation portions 442 (four in the present preferred embodiment) are preferably formed integrally with the basal portion 441 by bending upwards such that the circuit board fixation portions 442 are positioned axially above the basal portion 441. Each of the circuit board fixation portions 442 preferably has a plane portion 4421 substantially in parallel with the basal portion 441. The circuit board 43 is preferably placed on upper surfaces of the plane portions 4421. Each of the plane portions 4421 is preferably formed with a through hole 4421a. According to the present preferred embodiment, inserted into each of the through holes 4421a is a thread functioning as a fixation member.

The mounting portions 443 (four in the present preferred embodiment) are preferably formed integrally with the basal portion 441 by bending downwards such that the mounting portions 443 are positioned axially below the basal portion 441. Each of the mounting portions 443 preferably has a plane portion 4431 substantially in parallel with the basal portion 441. Each of the plane portions 4431 is preferably formed with a through hole 4431a.

Referring to FIG. 8, the housing 42 is preferably attached to the attachment plate 44 such that one of the housing-side positioning portions 4223 is engaged with the attachment-plate-side positioning portion 4414 of the attachment plate 44. The housing 42 is preferably attached to the attachment plate 44 from the lower surface side of the basal portion 441. The cylindrical retentive portion 421 and the expanded diameter portion 4213 of the housing 42 are preferably inserted into the first through hole 4412 of the attachment plate 44. The plurality of burling portions 4221 of the flange portion 422 are preferably inserted respectively into the second through holes 4413 of the attachment plate 44.

A space formed between the housing-side positioning portion 4223 and the attachment-plate-side positioning portion 4414 is preferably made smaller than a space formed between the outer peripheral surface of the expanded diameter portion 4213 and the inner peripheral surface of the first through hole 4412 as well as a space formed between the outer peripheral surface of each of the burling portions 4221 and the inner peripheral surface of each of the second through holes 4413. According to such a configuration, the housing 42 may be easily attached to the attachment plate 44 with high accuracy in the circumferential and radial directions. In particular, one of the housing-side positioning portions 4223 and the attachment-plate-side positioning portion 4414 are engaged with each other at one position, and the housing-side positioning portion 4223 is formed into the substantially semicircular shape so as to be engaged with the attachment-plate-side positioning portion 4414 with a small area, thereby high dimensional accuracy can be realized.

Referring to FIG. 9, the plurality of burling portions 4221 of the flange portion 422 are preferably pressed, by a pressing machine (not shown) from axially above, such that the diameters of the regions projecting from the upper surface of the fixation portion 4411 of the attachment plate 44 are expanded. Accordingly, the mounting portion 443 is preferably interposed between the upper surface of the flange portion 422 and extended portions 4221a of the burling portions 4221, so that the housing 42 is fixed to the attachment plate 44. According to such a structure, the housing 42 may be securely fixed while minimizing circumferential displacement of the housing 42 with respect to the attachment plate 44. In each of the burling portions 4221, a region to be inserted through each of the second through holes 4413 of the attachment plate 44 is referred to as an insertion through portion. A lower surface of each of the extended portions 4221a is in contact with the upper surface of the fixation portion 4411 of the attachment plate 44.

As the flange portion 422 is fixed onto the lower surface of the fixation portion 4411 of the attachment plate 44, each of the fitting portions 423 of the housing 42 may have a smaller axial length. Since the fitting portions 423 are formed while being circumferentially spaced apart from one another, strength of each of the fitting portions 423 is made weaker than that of the expanded diameter portion 4213. Thus, when the fitting portions 423 are formed to be axially longer, the strength of each of the fitting portions 423 is further weakened. Particularly in a case where a fixation portion 4411a of the attachment plate 44a is attached onto a lower surface of a flange portion 422a of the housing 42a as shown in FIG. 10, fitting portions 423a are required to be extended axially downwards by a length corresponding to a thickness of the fixation portion 4411a, resulting in reduced strength of the fitting portions 423a. Therefore, the fitting portions 423 are desirably formed to have an axial length as small as possible. In comparison to the configuration of FIG. 10, the configuration according to the present invention allows the axial length of the fitting portions 423 to be reduced since the fixation portion 4411 is disposed on the upper surface of the flange portion 422 and the fitting portions 423 have only to project slightly from the flange portion 422. Therefore, the strength of the fitting portions 423 may be increased in comparison to the configuration of FIG. 10.

The burling portions 4221 are formed on the upper surface of the flange portion 422 to be pressed on the upper surface of the fixation portion 4411, so that the extended portions 4221a which are radially expanded from the burling portions 4221 do not project downwards from the lower surface of the flange portion 422. In addition, the lower surface of the mounting portions 443 may be made axially closer to the lower surface of the flange portion 422, so that the axial length of the fitting portions 423 may be made smaller. As the fitting portions 423 are used to be fitted with other members, the fitting portions 423 are required to project axially downwards from the lower surfaces of the mounting portions 443. With such a restriction that the fitting portions 423 need to respectively project axially downwards from the lower surfaces of the mounting portions 443, the configuration according to the present invention allows the axial length of the fitting portions 423 to be shorten as much as possible, as the fixation portion 4411 is fixed onto the upper surface of the flange portion 422 and the burling portions 4221 are formed on the upper surface of the flange portion 422. Further, since the mounting portions 443 and the basal portion 441 are not on an identical plane, only the mounting portions 443 may be each formed into a plane of high flatness to be accurately in parallel with the fixation portion 4411. To the contrary, in a case where the basal portion 441 and the mounting portions 443 are located on an identical plane, the mounting portions 443 are formed on the lower surface of the basal portion 441, thereby the entire plane is required to be finished with high flatness. It is substantially quite difficult to flatly finish the entire plane since the plane of the basal portion 441 has a large area. However, in a case where the mounting portions 443 and the basal portion 441 are not formed on an identical plane, the planes of the mounting portions 443 are required to be finished with high flatness. The mounting portions 443 may be easily finished with high flatness since each of the mounting portions 443 has an area much smaller than that of the basal portion 441.

Structure of Fixing Armature 41 to Housing 42

Figure 11:
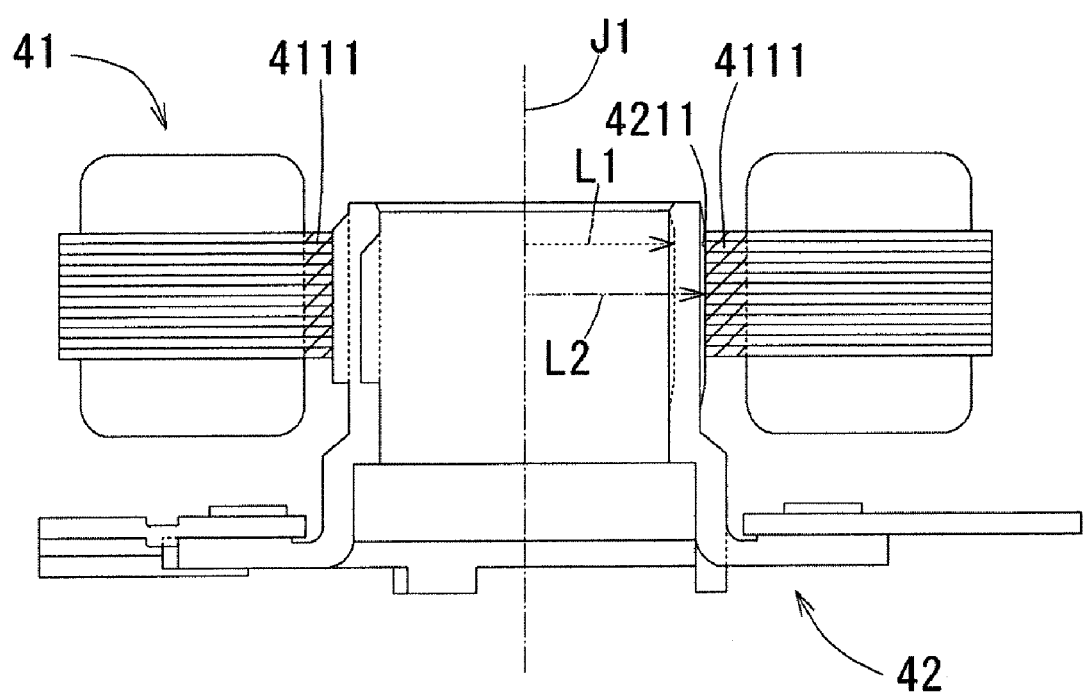
FIG. 11 is a schematic cross sectional view cut along the axial direction to illustrate a state where a stator is fixed to the housing according to the present invention.
Figure 13:
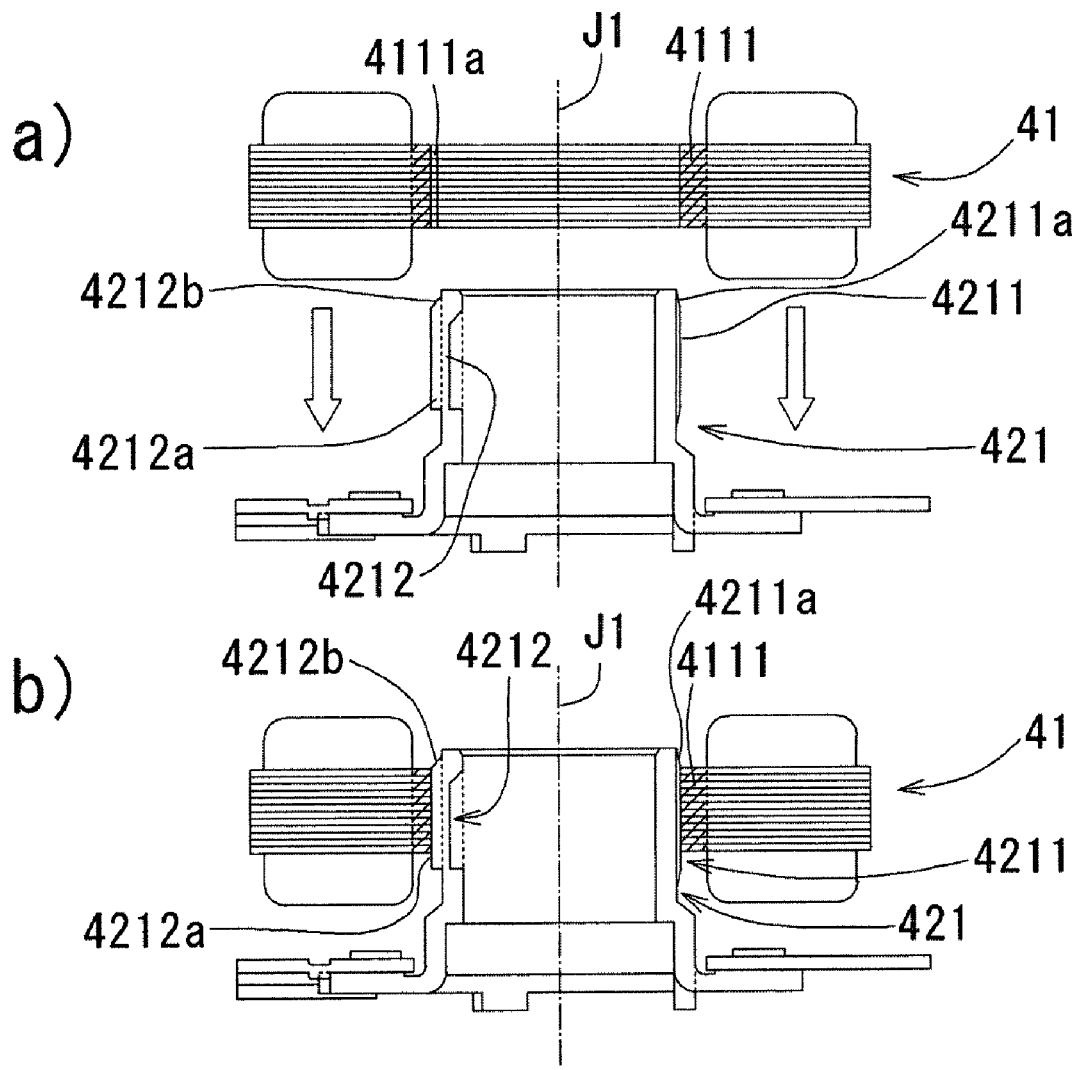
FIG. 13A is a schematic cross sectional view cut along the axial direction to illustrate a process in which the stator us attached to the housing according to the present invention.
FIG. 13B is a schematic cross sectional view cut along the axial direction to illustrate a state after the stator is attached to the housing according to the present invention.
Figure 14:
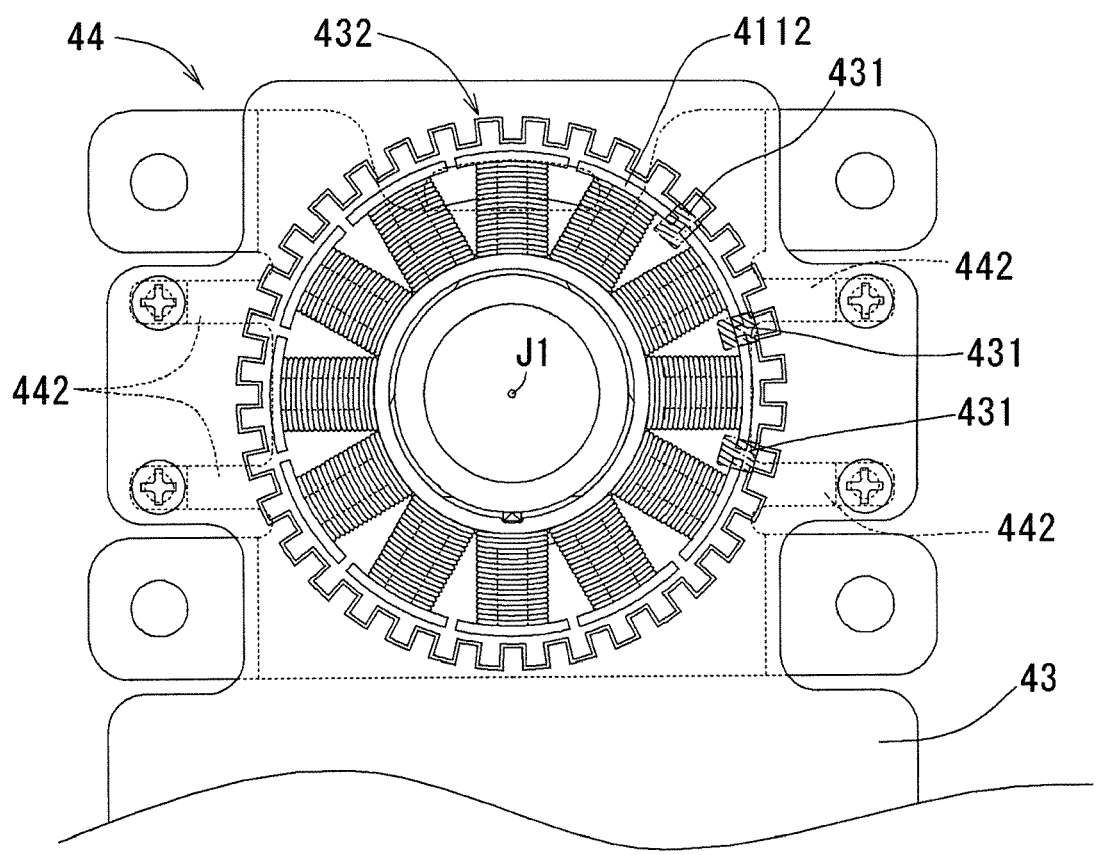
FIG. 14 is a plan view seen from above to illustrate a positional relationship between a circuit board and the stator according to the present invention.

With reference to FIGS. 11 to 14, description is given to a structure of fixing the armature 41 to the housing 42. FIG. 11 is a schematic cross sectional view cut along the axial direction to illustrate a state where the armature 41 is fixed to the housing 42. FIG. 12 is a plan view seen from above to illustrate the state where the armature 41 is fixed to the housing 42. FIGS. 13A and 13B are schematic cross sectional views to illustrate a process in which the armature 41 is fixed to the housing 42. FIG. 14 is a plan view seen from above to illustrate a positional relationship between the circuit board 43 and the armature 41.

Referring to FIG. 11, the inner peripheral surface of the core back portion 4111 of the armature 41 is preferably in contact with the outer peripheral surfaces of the armature retentive portions 4211 of the cylindrical retentive portion 421. The radial distance L2 from the central axis J1 to the outer peripheral surface of each of the armature retentive portions 4211 is preferably made larger by several to more than ten μm than the radial distance from the central axis J1 to the inner peripheral surface of the core back portion 4111. That is, the armature 41 is preferably press fitted to the armature retentive portions 4211. There are preferably provided three armature retentive portions 4211 while being circumferentially spaced apart from one another, so that the area to be press fitted to the inner peripheral surface of the core back portion 4111 is reduced in comparison to a case where there is provided one single armature retentive portion 4211 in a cylindrical shape, resulting in reduction in press fit force for fixing the armature 41 onto the armature retentive portions 4211. In particular, the housing 42 is formed by drawing a metal plate, so that each of the armature retentive portions 4211 of the cylindrical retentive portion 421 is formed into a tapered shape such that the diameter thereof is reduced in the axial direction. Thus, assuming that the area of the core back portion 4111 to be press fitted to the armature retentive portions 4211 is constant, the press fit force working between the armature 41 and the armature retentive portions 4211 may be smaller in comparison to a case where the housing 42 is formed by cutting. When cutting is employed, the armature retentive portions 4211 of the cylindrical retentive portion 421 are generally cut along the circumferential direction to generate a plurality of axial shoulders on the armature retentive portions 4211, resulting in increase in press fit force.

Further, the radial distance L1 from the central axis J1 to the inner peripheral surface of each of the armature retentive portions 4211 is made larger than the radial distance L11 from the central axis J1 to the inner peripheral surface of the cylindrical retentive portion 421. According to such a configuration, even when the armature retentive portions 4211 are deformed by press fitting the armature 41 thereto, such deformation does not affect the ball bearing 31 functioning as one of the bearing portions 30 which is accommodated in the cylindrical retentive portion 421. On the other hand, in a case where the radial distance L1 from the central axis J1 to the inner peripheral surface of each of the armature retentive portions 4211 is made identical to the radial distance L11 from the central axis J1 to the inner peripheral surface of the cylindrical retentive portion 421, the armature retentive portions 4211 are deformed toward the central axis J1 by press fitting the armature 41 thereto, so that the armature retentive portions 4211 are brought into contact with the outer ring of the ball bearing 31. Deformation of the outer ring of the ball bearing 31 due to deformation of the armature retentive portions 4211 may cause a damage to a ball disposed in the ball bearing 31, resulting in generation of unusual noise. Generation of such unusual noise may be minimized when the armature 41 is press fitted to the armature retentive portions 4211 with an adequate space provided between the outer peripheral surface of the outer ring of the ball bearing 31 and the inner peripheral surface of each of the armature retentive portions 4211 such that the ball bearing 31 is not affected. However, since it is impossible to accurately align the axial center of the cylindrical retentive portion 421 and that of the ball bearing 31, rotation of the shaft 21 is fluctuated to cause deterioration in accuracy of the shaft 21 functioning as an output axis. According to the present invention, the radial distance L1 from the central axis J1 to the inner peripheral surface of each of the armature retentive portions 4211 is made larger such that a radial space is formed between the outer peripheral surface of the outer ring of the ball bearing 31 and each of the armature retentive portions 4211. Therefore, there is provided a motor in which the outer ring of the ball bearing 31 is not affected and fluctuation in rotation of the shaft 21 is suppressed by accurately aligning the axial center of the ball bearing 31 and that of the cylindrical retentive portion 421. In addition, there is provided a radial space between the inner peripheral surface of the core back portion 4111 of the armature 41 and the outer peripheral surface of the cylindrical retentive portion 421 at regions where no armature retentive portion 4211 is formed. In such a configuration, the armature 41 press fitted to the armature retentive portions 4211 does not affect the outer peripheral surface of the cylindrical retentive portion 421 at regions where no armature retentive portion 4211 is formed, thereby minimizing the outer ring of the ball bearing 31 from being affected.

Referring to FIG. 12, the projection 4212 formed on the cylindrical retentive portion 421 of the housing 42 is preferably inserted into the radial recess 4111a formed on the core back portion 4111 of the armature 41. Thus, the armature 41 is accurately positioned in the circumferential direction with respect also to the attachment plate 44. The axial length of the projection 4212 is preferably made larger than the axial length of the core back portion 4111 of the armature core 411.

Referring to FIG. 14, the attachment plate 44 preferably determines the position of the circuit board 43 by the circuit board fixation portions 442. According to the present preferred embodiment, the circuit board 43 is fixed onto the attachment plate 44 by fixing the threads at the circuit board fixation portions 442. Since there are mounted, on the lower surface (surface facing the attachment plate 44) of the circuit board 43, hall elements 431 detecting magnetic poles of the rotor magnet 22, accurate positioning in the circumferential direction is enabled among the plurality of tooth portions 4112 of the armature 41 and the hall elements 431. Therefore, it is possible to increase accuracy in rotation of the motor 10.

Further, there is formed an FG pattern 432 on the upper surface (surface facing the armature 41) of the circuit board 43. The FG pattern 432 axially faces the lower end surface of the rotor magnet 22 with a space therebetween. The lower end surface of the rotor magnet 22 is preferably multipolar-magnetized. When the lower end surface of the rotor magnet 22 moves in the circumferential direction above the FG pattern 432, a pulse signal is inputted into an integrated circuit (not shown) mounted onto the circuit board 43. Thus, use of the hall elements 431 together with the FG pattern 432 realizes rotation control of high accuracy.

Referring to FIG. 13, in the armature 41, the radial recess 4111a of the core back portion 4111 is circumferentially guided by the reduced portion 4212b of the projection 4212 before the inner peripheral surface of the core back portion 4111 is brought into contact with the armature retentive portions 4211. Accordingly, the projection 4212 is preferably formed axially above the regions of the armature retentive portions 4211 to which the core back portion 4111 is press fitted. According to such a configuration, the armature 41 may be accurately positioned in the circumferential direction with respect to the housing 42 before the armature 41 is press fitted to the armature retentive portions 4211. There is preferably formed axially above each of the armature retentive portions 4211 a core-back-portion guide portion 4211a in an inclined surface shape of which diameter is expanded axially downwards. According to this configuration, it is possible to accurately align the axial center of the cylindrical retentive portion 421 and that of the armature 41. Therefore, it is possible to minimize press fitting inclined into one direction due to misalignment between the axial center of the armature 41 and that of the cylindrical retentive portion 421.

Alignment Between Housing 42 and Bearing Portions 30

Figure 15:
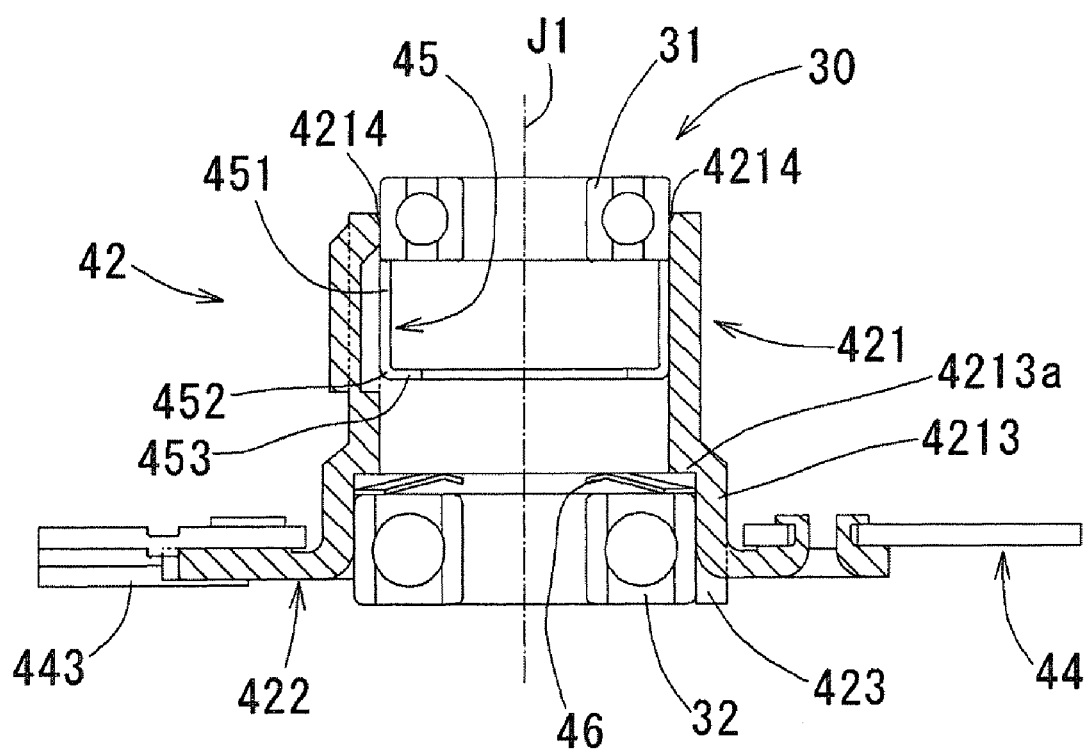
FIG. 15 is a schematic cross sectional view cut along the axial direction to illustrate an alignment between the housing and bearing portions according to the present invention.

With reference to FIG. 15, described below is an alignment between the housing 42 and the bearing portions 30 according to the present invention. FIG. 15 is a schematic cross sectional view cut along the axial direction to illustrate a state where the bearing portions 30 are disposed in the housing 42.

Referring to FIG. 15, there is preferably fixed onto the inner peripheral surface of the cylindrical retentive portion 421 of the housing 42 a positioning member 45 determining an axial position of the ball bearing 31 functioning as one of the bearing portions 30. The positioning member 45 is preferably formed by pressing, and is configured with a cylindrical fixation portion 451 in a cylindrical shape to be fixed onto the inner peripheral surface of the cylindrical retentive portion 421, a bent portion 452 bent radially inwards from a lower end of the cylindrical fixation portion 451, and a placing portion 453 in an annular plane shape extending from the bent portion 452 toward the central axis J1. The positioning member 45 preferably has a thickness smaller than that of the housing 42. The positioning member 45 is preferably press fitted and fixed into the cylindrical retentive portion 421.

There is preferably formed on an upper part of the inner peripheral surface of the cylindrical retentive portion 421 a guide portion 4214 in an inclined surface shape of which diameter is expanded axially upwards. As the bent portion 452 of the positioning member 45 is guided by the guide portion 4214, the cylindrical fixation portion 451 of the positioning member 45 is preferably press fitted into the cylindrical retentive portion 421. Thus, the positioning member 45 is fixed highly coaxially to the cylindrical retentive portion 421. Moreover, the configurations of the armature retentive portions 4211 and the projection 4212 reduce the area of the cylindrical fixation portion 451 in contact with (press fitted into) the cylindrical retentive portion 421, so that the positioning member 45 may be press fitted into the cylindrical retentive portion 421 with a small force. In addition, since the thickness of the positioning member 45 is smaller than that of the cylindrical retentive portion 421, the positioning member 45 is deformed radially inwards due to press fitting thereof before deformation of the cylindrical retentive portion 421 occurs, resulting in restricted deformation of the cylindrical retentive portion 421.

Disposed at the shoulder 4213a of the expanded diameter portion 4213 is an elastic member 46 (a wave washer according to the present preferred embodiment). The ball bearing 32 is preferably disposed on the inner peripheral surface of the expanded diameter portion 4213. The elastic member 46 is preferably held while being compressed between the plane of the shoulder 4213a and the outer ring of the ball bearing 32. The ball bearing 32 is preferably disposed axially below the flange portion 422 and the mounting portions 443. The lower surface of the ball bearing 32 is preferably disposed at a position substantially identical in the axial direction to the lower surfaces of the fitting portions 423. According to such a configuration, the fitting portions 423 are supported by the outer peripheral surface of the ball bearing 32, so that deformation of the fitting portions 423 is minimized.

Motor According to Second Preferred Embodiment

Figure 16:
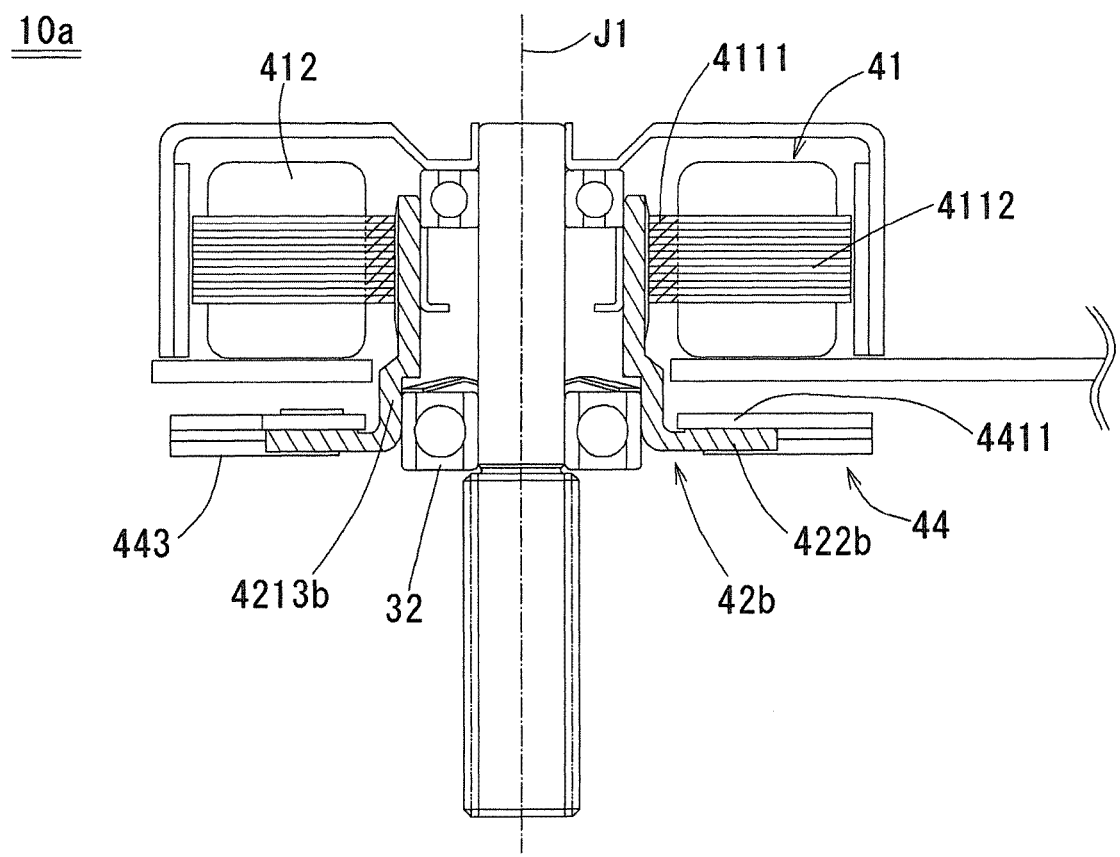
FIG. 16 is a schematic cross sectional view of a motor cut along an axial direction, according to a second preferred embodiment of the present invention.

With reference to FIG. 16, description is given to a motor according to a second preferred embodiment of the present invention. FIG. 16 is a schematic cross sectional view of the motor cut along the axial direction, according to the second preferred embodiment of the present invention. In the following description of the motor according to the second preferred embodiment, members identical to those of the motor 10 according to the first preferred embodiment are designated respectively with identical symbols, and description thereof is not repeated.

Referring to FIG. 16, a motor 10a according to the second preferred embodiment is different from the motor 10 according to the first preferred embodiment in that no fitting portion 423 is formed at a housing 42b. As there is formed no fitting portion 423, no opening 4222 is formed either. A part of the outer ring of the ball bearing 32 is preferably positioned axially below a lower surface of a flange portion 422b. In the motor 10a, the outer peripheral surface of the outer ring of the ball bearing 32 preferably functions as the fitting portion 423 of the motor 10. In general, an outer diameter of a ball bearing is highly accurate in dimension with dimensional difference of only several μm, so that it is possible to increase accuracy in outer diameter of the ball bearing 32 functioning as a fitting portion. Further, as the axially lower surface of the ball bearing 32 is disposed axially below the lower surfaces of the mounting portions 443, the outer peripheral surface of the ball bearing 32 may function as the fitting portion.

In particular, as the fixation portion 4411 of the attachment plate 44 is fixed onto the upper surface of the flange portion 422b, the axial length of the region functioning as a fitting portion may be reduced, thereby realizing utilization of the outer peripheral surface of the ball bearing 32 as the fitting portion. Utilization of a part in the axial direction of the ball bearing 32 as the fitting portion reduces the axial length of a radially aligning region between an expanded diameter portion 4213b supporting the outer peripheral surface of the ball bearing 32 and the outer peripheral surface of the ball bearing 32. In such a state, a heavy load applied to the shaft 21 generally increases a pressure applied to the outer peripheral surface of the ball bearing 32 due to contact thereof with the expanded diameter portion 4213. As a result, the outer ring of the ball bearing 32 may be deformed to cause unusual noise.

However, in the motor 10a according to the present preferred embodiment, as the fixation portion 4411 of the attachment plate 44 is fixed onto the upper surface of the flange portion 422b, it is possible to secure as much as possible the area where the expanded diameter portion 4213b supports the outer peripheral surface of the ball bearing 32. Thus, it is possible to reduce the pressure applied by the contact between the outer peripheral surface of the ball bearing 32 and the expanded diameter portion 4213b, resulting in reduction of unusual noise.

The ball bearing 32 desirably has the outer diameter larger (that is, an axial length is also larger) than that of the ball bearing 31. When the outer diameter of the ball bearing 32 is larger than that of the ball bearing 31, it is possible to increase the area where the expanded diameter portion 4213b supports the ball bearing 32. In addition, when the outer diameter of the ball bearing 31 is made smaller, it is possible to reduce the size of the inner peripheral surface of the core back portion 4111 of the armature 41, thereby enabling to increase the radial length of the tooth portions 4112. Therefore, it is possible to provide a motor of high efficiency with a large winding number of the coil 412 (the number of winding the conductive wire around the tooth portion 4112 to form the coil 412) while reducing unusual noise of the ball bearing.

Motor According to Third Preferred Embodiment

Figure 17:
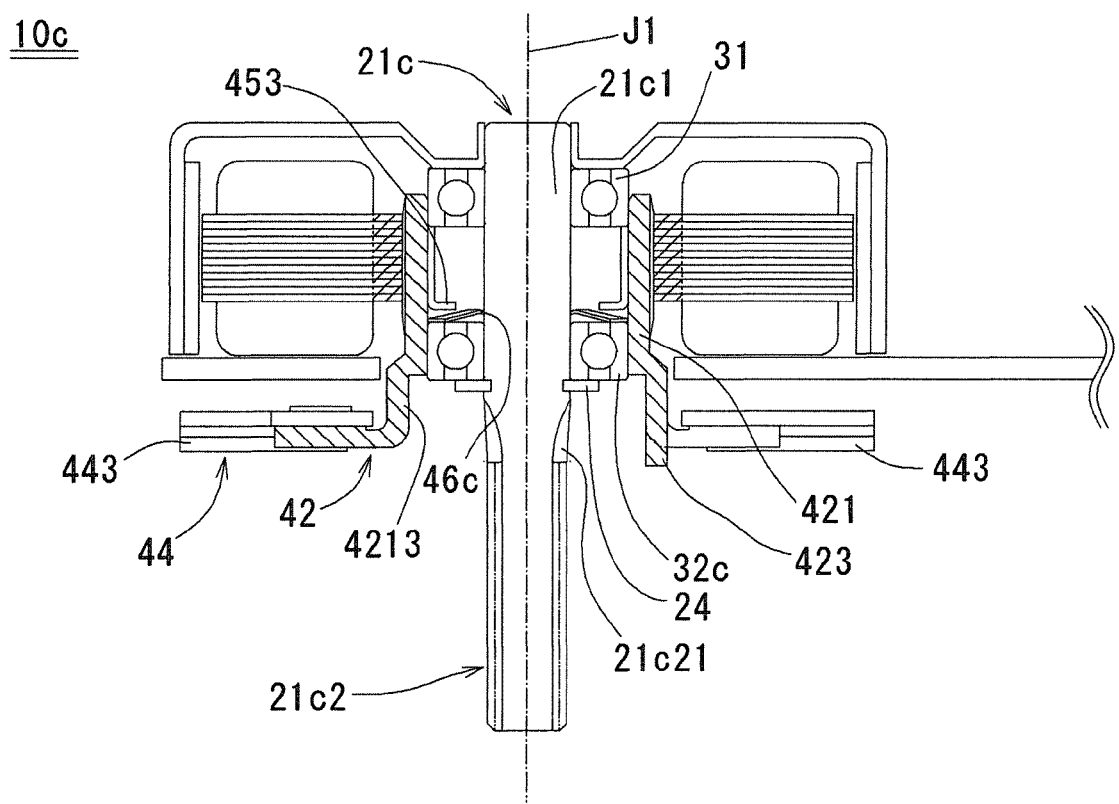
FIG. 17 is a schematic cross sectional view of a motor cut along an axial direction, according to a third preferred embodiment of the present invention.

With reference to FIG. 17, description is given to a motor according to a third preferred embodiment of the present invention. FIG. 17 is a schematic cross sectional view of the motor cut along the axial direction, according to the third preferred embodiment of the present invention. In the following description of the motor according to the third preferred embodiment, members identical to those of the motor 10 according to the first preferred embodiment are designated respectively with identical symbols, and description thereof is not repeated.

Referring to FIG. 17, a motor 10c according to the third preferred embodiment is different from the motor 10 according to the first preferred embodiment in a shaft 21c, a ball bearing 32c, and an elastic member 46c.

The shaft 21c is preferably configured with a bearing fixation portion 21c1 supporting the bearing portions 30, and a gear portion 21c2 formed axially under the bearing fixation portion 21c1 to transfer to a target member rotary torque of the motor 10c. The gear portion 21c2 is preferably formed integrally with a gear. In particular, the gear according to the present preferred embodiment is a helical gear preferably realizing reduction in noise generated due to engagement. The gear portion 21c2 preferably has an outer diameter smaller than that of the bearing fixation portion 21c1.

The ball bearing 32c is preferably disposed axially above the expanded diameter portion 4213. Specifically, the elastic member 46c is preferably disposed on the placing portion 453 of the positioning member 45, and the ball bearing 32c is disposed axially therebelow. The ball bearing 32c is preferably supported by the inner peripheral surface of the cylindrical retentive portion 421. There is preferably fixed a check member 24 (a C-shaped ring according to the present preferred embodiment) to the shaft 21c so that the check member 24 is brought into contact with a lower surface of the ball bearing 32c. The check member 24 preferably prevents the ball bearing 32c from being displaced axially downwards. Since the outer diameter of the gear portion 21c2 is smaller than that of the bearing fixation portion 21c1, there is formed axially above the gear portion 21c2 an unprocessed portion 21c21 which is not formed into the helical gear during the process of integrally forming the helical gear. The unprocessed portion 21c21 preferably connects from an upper surface of the gear portion 21c2 to the bearing fixation portion 21c1. Particularly, the helical gear is preferably formed by bringing a disk shaped gear into contact with the shaft 21c to cut the same, thereby inevitably forming the unprocessed portion 21c21 (hereafter, also referred to a "connect portion") of several mm in the axial direction. Formation of the unprocessed portion 21c21 requires increase in axial length of the shaft 21c from the mounting portions 443. However, in the motor 10c according to the present preferred embodiment, the unprocessed portion 21c21 is preferably accommodated in the fitting portions 423 (specifically, at least a part of the unprocessed portion 21c21 is positioned axially above the lower end surfaces of the fitting portions 423), thereby reducing the axial length of the shaft 21c from the mounting portions 443. Therefore, it is possible to reduce the axial length of the motor 10c. As a result, there is provided a smaller motor.

Motor According to Fourth Preferred Embodiment

Figure 18:
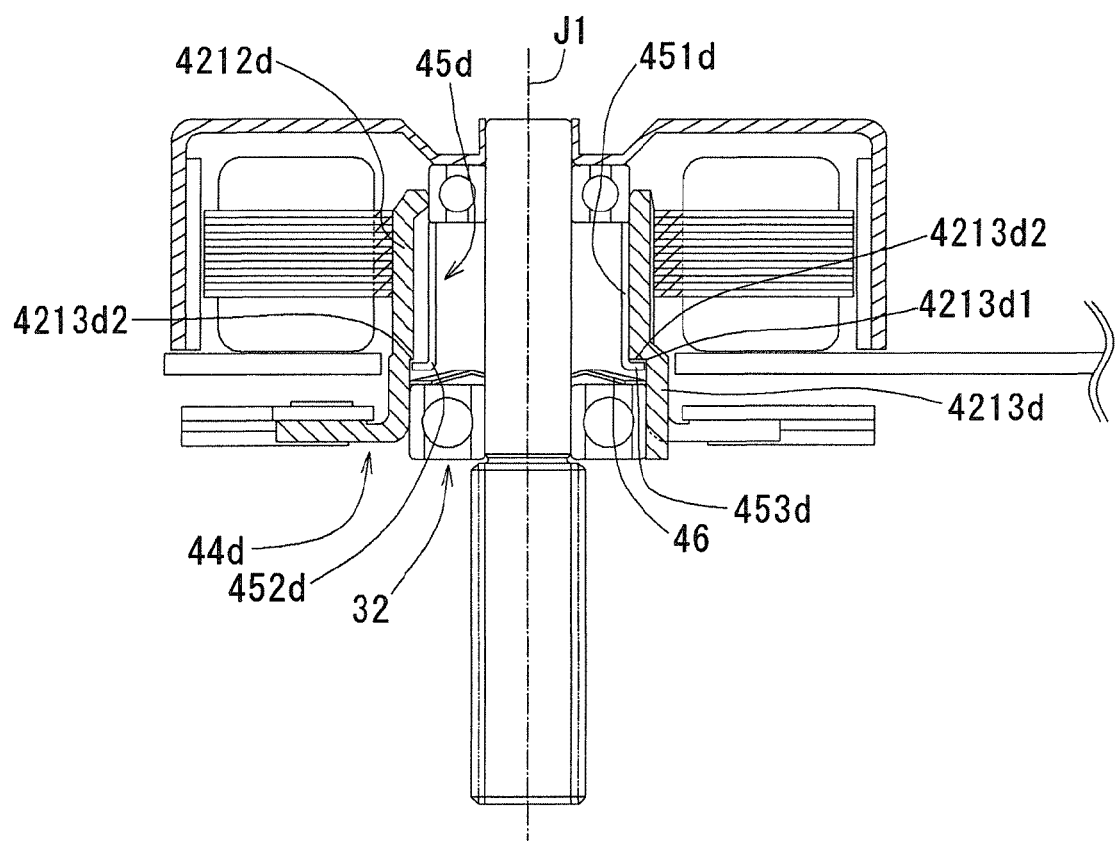
FIG. 18 is a schematic cross sectional view of a motor cut along an axial direction, according to a fourth preferred embodiment of the present invention.
Figure 19:
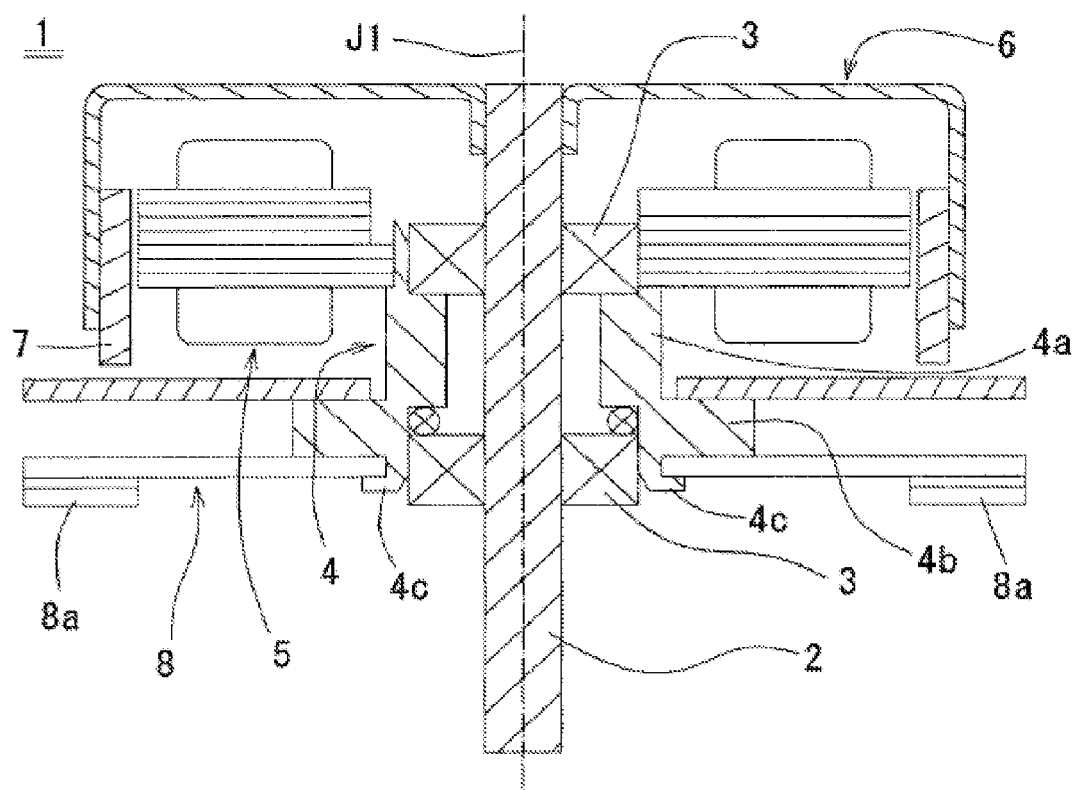
FIG. 19 is a schematic cross sectional view of a conventional motor cut along an axial direction.

With reference to FIG. 18, description is given to a motor according to a fourth preferred embodiment of the present invention. FIG. 18 is a schematic cross sectional view of the motor cut along the axial direction, according to the fourth preferred embodiment of the present invention. In the following description of the motor according to the fourth preferred embodiment, members identical to those of the motor 10 according to the first preferred embodiment are designated respectively with identical symbols, and description thereof is not repeated.

Referring to FIG. 18, a motor 10d according to the fourth preferred embodiment is different from the motor 10 according to the first preferred embodiment in a housing 42d and a positioning member 45d.

In the housing 42d, a projection 4212d is directly continuous to an expanded diameter portion 4213d. Thus, a plane 4213d2, which axially faces the ball bearing 32 provided at a shoulder 4213d1, has radial a width not constant in the circumferential direction (specifically, the radial width of the plane 4213d2 is reduced at a position where the projection 4212d is formed). The ball bearing 32 has an inner ring retained by the shaft 21 and an outer ring retained by the expanded diameter portion 4213d.

The positioning member 45d is preferably configured with a cylindrical fixation portion 451d press fitted into the inner peripheral surface of the cylindrical retentive portion 421 of the housing 42d, a bent portion 452d bent radially outwards from the cylindrical fixation portion 451d, and a placing portion 453d in an annular plane shape extending radially outwards from the bent portion 452d. The placing portion 453d axially faces the outer ring of the ball bearing 32 with a space therebetween. The elastic member 46 is preferably disposed on a lower surface of the placing portion 453d. The positioning member 45d is preferably press fitted from the side of the expanded diameter portion 4213d. The elastic member 46 is preferably interposed while being compressed axially between the lower surface of the placing portion 453d and the outer ring of the ball bearing 32.

As the placing portion 453d is disposed axially below the plane 4213d2, the plane 4213d2 is not required to be highly accurate in dimension, resulting in easier formation of the housing 42d. Further, as the outer peripheral surface of the placing portion 453d is disposed to radially face the inner peripheral surface of the expanded diameter portion 4213d with a space therebetween, it is possible to increase accuracy of the lower surface of the placing portion 453d.

The upper end surface of the cylindrical fixation portion 451d of the positioning member 45d is preferably in contact with the lower surface of the outer ring of the ball bearing 31. Therefore, the positioning member 45d is possible to determine respectively the axial positions of the ball bearings 31 and 32.

The housings 42 and 42b used in either of the motor 10 of the first preferred embodiment, the motor 10b of the second preferred embodiment, and the motor 10c of the third preferred embodiment may be shaped with a common die specified as a transfer press die. In the transfer press die, respectively independent pressing steps are arranged in the single press die. Therefore, it is possible to shape the two different types of housings 42 and 42b with the single die by adding in the press die a step of forming the fitting portions 423 during the steps of shaping the housing 42b. In this case, it is possible to realize significant reduction in cost for dies with no need for different types of press dies in accordance with individual types of motors. The housing 42d in the motor 10d of the fourth preferred embodiment may be shaped with a die in common with the housings in the motor 10b of the second preferred embodiment and the motor 10c of the third preferred embodiment.

In each of the motors according to the first and second preferred embodiments of the present invention, the axial position of the ball bearing 31 may be adjusted by adjusting the axial position of the positioning member 45 with respect to the cylindrical retentive portion 421 of the housing 42. Accordingly, it is possible to adjust the axial height (height of the motor) from the fixation portion 4411 to the outer cap portion 234 of the rotor holder 23. Specifically, reduction in height of the motor may be realized by disposing the positioning member 45 and the ball bearing 31 axially low with respect to the cylindrical retentive portion 421 of the housing 42 so that the outer cap portion 234 of the rotor holder 23 is disposed axially closer to the fixation portion 4411. Accordingly, various types of motors different from one another in height thereof may be configured with the single type of housing 42, the single type of positioning member 45, and the single type of the ball bearing 31. In other words, the housing 42, the positioning member 45, and the ball bearing 31 may be commonly used in different types of motors.

In each of the motors according to the third and fourth preferred embodiments of the present invention, the axial position of the ball bearing 31 may be adjusted by changing the axial length of the positioning member 45 or 45d. Specifically, reduction in height of the motor may be realized by reducing the axial length of the cylindrical fixation portion 451 or 451d of the positioning member 45 or 45d so that the outer cap portion 234 of the rotor holder 23 is disposed axially closer to the fixation portion 4411.

The axial lengths of the armature 41 and the cylindrical portion 235 of the rotor holder 23 are appropriately changed in accordance with the height of the motor.

The preferred embodiments of the present invention have been described in detail. However, the present invention is not limited thereto but may be modified in various ways within the scope of the appended claims.

According to the present invention, the bearing portions 30 correspond to the ball bearings 31 and 32. Alternatively, an oil retaining bearing in which oil is retained in a sintered material may be used in place of the ball bearing 31.

According to the present preferred embodiments, the housing 42 is preferably fixed to the attachment plate 44 by plastically deforming the burling portions 4221 of the housing 42 to be fixed onto the upper surface of the attachment plate 44.

However, the present invention is not limited to such a configuration. Alternatively, the flange portion 422 of the housing 42 and the fixation portion 4411 of the attachment plate 44 may be fixed to each other by welding.

Further, although the projection 4212 according to the present preferred embodiments is formed with the reduced portion 4212b, the present invention is not limited thereto. The projection 4212 may not be provided with the reduced portion 4212b but to extend to a position corresponding to the reduced portion 4212b.

According to the third preferred embodiment of the present invention, the check member 24 is fixed to the shaft 21c. However, the present invention is not limited to such a configuration. Provision of the check member 24 is not necessarily required. In a case where there is provided no check member 24, the shaft 21c and the ball bearing 32c are desirably fixed to each other by press fitting.

Further, although the cylindrical retentive portion 421 of the housing 42 according to the present invention has the cylindrical shape, the present invention is not limited thereto. Specifically, the shapes of the inner and outer peripheral surfaces of the cylindrical retentive portion 421 are not limited to the cylindrical shape. Alternatively, the inner and outer peripheral surfaces of the cylindrical retentive portion may be formed respectively into a polygonal shape.

According to the present invention, the axial length of the projection 4212 of the cylindrical retentive portion 421 in the housing 42 is made longer than the axial length of the core back portion 4111 of the armature core 411 in the armature 41. However, the present invention is not limited to such a configuration. Alternatively, the axial length of the projection may be substantially identical to the axial length of the core back portion.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
a shaft arranged concentrically about a central axis;
a housing including a cylindrical portion in which an inner peripheral surface and an outer peripheral surface thereof extend concentrically with the central axis, and a flange portion which is defined integrally with the cylindrical portion and provided with an upper surface and a lower surface each of which extend radially outwards;
an attachment plate including a fixation portion which includes a flat shape and which is provided with a lower surface fixed only to the upper surface of the flange portion, and a plurality of mounting portions which are defined integrally with the fixation portion and which are arranged to fix another member thereto; and
a bearing portion retained at the inner peripheral surface of the cylindrical portion so as to rotatably support the shaft; wherein
a plurality of fitting portions are arranged in a circumferential direction at an axially lower side of the flange portion and each of the plurality of fitting portions extend continuously from the cylindrical portion;
the flange portion includes a plurality of openings which are arranged in the circumferential direction evenly apart from one another corresponding to the fitting portions, and which respectively penetrate from the upper surface to the lower surface each of the plurality of openings extending outwardly in a radial direction from an inner peripheral edge of the flange portion,
a maximum circumferential width of each of the plurality of openings is equal to or greater than a maximum circumferential width of the corresponding fitting portions, and
a maximum radial width of each of the plurality of openings is equal to or greater than a distance between a lower end surface of the fitting portion and the lower surface of the flange portion.

2. The motor according to claim 1, wherein
a circuit board is arranged axially above the attachment plate via an axial space defined therebetween, and
the attachment plate includes a circuit board fixation portion which is arranged to retain the circuit board integrally with the fixation portion.

3. The motor according to claim 1, wherein
the fixation portion of the attachment plate includes a through hole at a portion thereof which axially corresponds to the flange portion,
the flange portion includes a burling portion including an insertion through portion having a substantially cylindrical shape inserted through the through hole, and
an extended portion including a lower surface arranged to make contact with an upper surface of the fixation portion of the attachment plate.

4. The motor according to claim 1, wherein
the flange portion includes a housing-side positioning portion at which the outer peripheral surface is recessed radially inwardly at an outer peripheral surface thereof, and
an attachment-plate-side positioning portion is arranged at a portion of the fixation portion of the attachment plate corresponding to the housing-side positioning portion such that the attachment-plate-side positioning portion engages therewith.

5. The motor according to claim 4, wherein only one attachment-plate-side positioning portion is provided.

6. A motor comprising:
a shaft arranged concentrically about a central axis;
a housing including a cylindrical portion in which an inner peripheral surface and an outer peripheral surface thereof extend concentrically with the central axis, and a flange portion which is defined integrally with the cylindrical portion and provided with an upper surface and a lower surface each of which extend radially outwards;
an attachment plate including a fixation portion which includes a flat shape and which is provided with a lower surface fixed only to the upper surface of the flange portion, and a plurality of mounting portions which are defined integrally with the fixation portion and which are arranged to fix another member thereto; and
a bearing portion retained at the inner peripheral surface of the cylindrical portion so as to rotatably support the shaft; wherein
a plurality of fitting portions are arranged in a circumferential direction at an axially lower side of the flange portion and each of the plurality of fitting portions extend continuously from the cylindrical portion;
the shaft extends lower in an axial direction than the fitting portion,
the shaft integrally includes a gear portion defined axially below the fitting portion,
a maximum diameter of the gear portion is smaller than a maximum radius of a portion of the shaft arranged axially above the gear portion, a connect portion at which a bottom portion of the gear portion extends to an outer peripheral surface of the portion of the shaft is arranged axially above the gear portion, and at least a portion of the connect portion extends axially above a lower end surface of the fitting portion.

7. The motor according to claim 6, wherein a circuit board is arranged axially above the attachment plate via an axial space defined therebetween, and the attachment plate includes a circuit board fixation portion which is arranged to retain the circuit board integrally with the fixation portion.

8. The motor according to claim 6, wherein the fixation portion of the attachment plate includes a through hole at a portion thereof which axially corresponds to the flange portion, the flange portion includes a burling portion including an insertion through portion having a substantially cylindrical shape inserted through the through hole, and an extended portion including a lower surface arranged to make contact with an upper surface of the fixation portion of the attachment plate.

9. The motor according to claim 6, wherein the flange portion includes a housing-side positioning portion at which the outer peripheral surface is recessed radially inwardly at an outer peripheral surface thereof, and an attachment-plate-side positioning portion is arranged at a portion of the fixation portion of the attachment plate corresponding to the housing-side positioning portion such that the attachment-plate-side positioning portion engages therewith.

10. The motor according to claim 9, wherein only one attachment-plate-side positioning portion is provided.

11. A motor comprising:

a shaft arranged concentrically about a central axis;

a housing including a cylindrical portion in which an inner peripheral surface and an outer peripheral surface thereof extend concentrically with the central axis, and a flange portion which is defined integrally with the cylindrical portion and provided with an upper surface and a lower surface each of which extend radially outwards;

an attachment plate including a fixation portion which includes a flat shape and which is provided with a lower surface fixed only to the upper surface of the flange portion, and a plurality of mounting portions which are defined integrally with the fixation portion and which are arranged to fix another member thereto; and a plurality of bearing portions retained at the inner peripheral surface of the cylindrical portion so as to rotatably support the shaft, wherein the plurality of bearing portions are arranged at an inner peripheral surface of the cylindrical portion with an axial space defined therebetween, one of the plurality of bearing portions arranged at an axially lower side is a ball bearing including an inner peripheral surface supported by an outer peripheral surface of the shaft and an outer peripheral surface supported by the inner peripheral surface of the cylindrical portion, and a portion of the outer peripheral surface of the ball bearing is arranged axially below the flange portion and the lower surface of the mounting portion.

12. The motor according to claim 11, wherein a circuit board is arranged axially above the attachment plate via an axial space defined therebetween, and the attachment plate includes a circuit board fixation portion which is arranged to retain the circuit board integrally with the fixation portion.

13. The motor according to claim 11, wherein the fixation portion of the attachment plate includes a through hole at a portion thereof which axially corresponds to the flange portion, the flange portion includes a burling portion including an insertion through portion having a substantially cylindrical shape inserted through the through hole, and an extended portion including a lower surface arranged to make contact with an upper surface of the fixation portion of the attachment plate.

14. The motor according to claim 11, wherein the flange portion includes a housing-side positioning portion at which the outer peripheral surface is recessed radially inwardly at an outer peripheral surface thereof, and an attachment-plate-side positioning portion is arranged at a portion of the fixation portion of the attachment plate corresponding to the housing-side positioning portion such that the attachment-plate-side positioning portion engages therewith.

15. The motor according to claim 14, wherein only one attachment-plate-side positioning portion is provided.

16. A motor comprising:

a shaft arranged concentrically about a central axis;

a housing including a cylindrical portion in which an inner peripheral surface and an outer peripheral surface thereof extend concentrically with the central axis, and a flange portion which is defined integrally with the cylindrical portion and provided with an upper surface and a lower surface each of which extend radially outwards;

an attachment plate including a fixation portion which includes a flat shape and which is provided with a lower surface fixed only to the upper surface of the flange portion, and a plurality of mounting portions which are defined integrally with the fixation portion and which are arranged to fix another member thereto; wherein the cylindrical portion includes a plurality of armature retentive portions arranged apart from one another in a circumferential direction wherein a distance between an inner peripheral surface thereof and the central axis, and a distance between an outer peripheral surface thereof and the central axis are greater than a distance between the inner peripheral surface of the cylindrical portion and the central axis and a distance between the outer peripheral surface of the cylindrical portion and the central axis, and the armature retentive portion includes at the outer peripheral surface thereof an armature having an armature core whose inner peripheral surface makes contact with the outer peripheral surface of the armature retentive portion.

17. The motor according to claim 16, wherein the bearing portions are arranged apart from one another in a radial direction at the inner peripheral surface of the armature retentive portion.

18. The motor according to claim 16, wherein
the inner peripheral surface of the armature core includes a recess concaved radially outward,
the cylindrical portion includes a projection arranged to project radially outwards to engage with the recess, and
a distance between the central axis and an outer peripheral surface of the projection is greater than a distance between the central axis and the outer peripheral surface of the armature fixation portion.

19. The motor according to claim 18, wherein the projection includes a reduced portion arranged at an axially upper side thereof in which a circumferential width thereof is gradually reduced in an axially upward direction.

20. The motor according to claim 19, wherein a distance between the central axis and an outer peripheral surface of the reduced portion decreases in the axially upward direction.

\* \* \* \* \*